United States Patent [19]

Matsuda

[11] Patent Number: 4,722,576
[45] Date of Patent: Feb. 2, 1988

[54] FAIL-SAFE SYSTEM IN ANTI-SKID BRAKE CONTROL SYSTEM FOR AUTOMOTIVE VEHICLES

[75] Inventor: Toshiro Matsuda, Sagamihara, Japan

[73] Assignee: Nissan Motor Company, Limited, Yokohama, Japan

[21] Appl. No.: 680,523

[22] Filed: Dec. 11, 1984

[30] Foreign Application Priority Data

Dec. 13, 1983 [JP] Japan .................. 58-233624

[51] Int. Cl.$^4$ .............................................. B60T 8/00
[52] U.S. Cl. ...................... 303/92; 303/119
[58] Field of Search .............. 303/92, 119, 100, 105, 303/106, 109; 364/426

[56] References Cited

U.S. PATENT DOCUMENTS

| | | | |
|---|---|---|---|
| 2,914,359 | 11/1959 | Yarber | 303/106 |
| 3,398,995 | 8/1968 | Martin | 303/105 |
| 3,503,653 | 3/1970 | Davis et al. | 303/95 |
| 3,637,264 | 1/1972 | Leiber et al. | 303/105 |
| 3,752,536 | 8/1973 | Machek | 303/115 |
| 3,930,688 | 1/1976 | Rau et al. | 303/106 |
| 3,938,612 | 2/1976 | Boudeville et al. | 180/197 |
| 3,943,345 | 3/1976 | Ando et al. | 364/560 |
| 3,985,396 | 10/1976 | Kuwana et al. | 303/105 |
| 3,989,063 | 11/1976 | Brouwers et al. | 303/119 |
| 4,009,914 | 3/1977 | Sato et al. | 303/92 |
| 4,090,739 | 5/1978 | Iio | 303/119 |
| 4,113,321 | 9/1978 | Bleckmann | 303/92 |
| 4,267,575 | 3/1981 | Bounds | 364/565 |
| 4,315,213 | 2/1982 | Wolff | 324/162 |
| 4,384,330 | 5/1983 | Matsuda et al. | 364/426 |
| 4,408,290 | 10/1983 | Kubo et al. | 364/566 |
| 4,569,560 | 2/1986 | Kubo | 303/116 |

FOREIGN PATENT DOCUMENTS

| | | |
|---|---|---|
| 51-89096 | 8/1976 | Japan . |
| 55-28900 | 7/1980 | Japan . |
| 56-100363 | 8/1981 | Japan . |
| 58-63558 | 4/1983 | Japan . |

Primary Examiner—John W. Caldwell, Sr.
Assistant Examiner—Alvin Oberley
Attorney, Agent, or Firm—Schwartz, Jeffery, Schwaab, Mack, Blumenthal & Evans

[57] ABSTRACT

A fail-safe system for an automotive anti-skid control system ensures that manual control of vehicle brakes is enabled if any system components should fail. The anti-skid control system employs actuators to control the brakes automatically, the actuators being powered by a vehicle battery. The power supply to the actuators is interrupted by the fail-safe system if malfunction of any system components is detected and the control signals for operating the actuators are held to a value such that the actuators are positioned in the brake pressure increase position. Specifically, the fail-safe system checks for open or short circuits in the actuators themselves, inaccuracy or failure of any of a plurality of wheel speed sensors, excessive or insufficient battery voltage, and malfunction of major system components such as a hydraulic pump used to expedite automatic control, signal processing units, etc. The particular type of malfunction may be recorded for reference during maintenance and repair.

9 Claims, 30 Drawing Figures

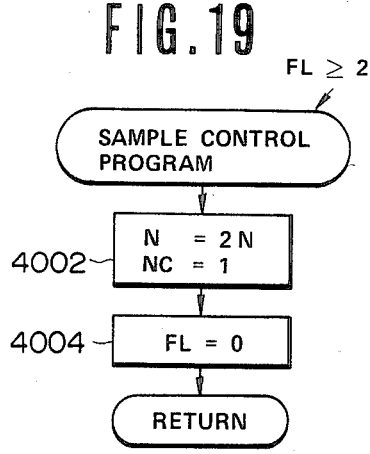
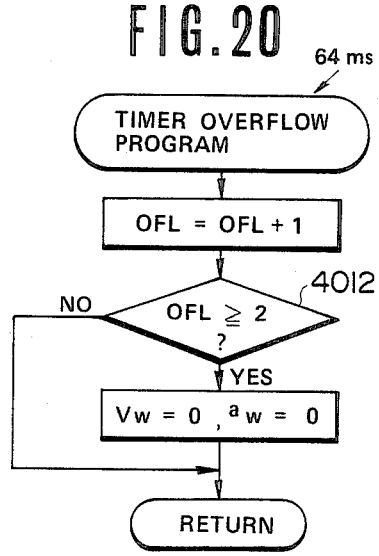
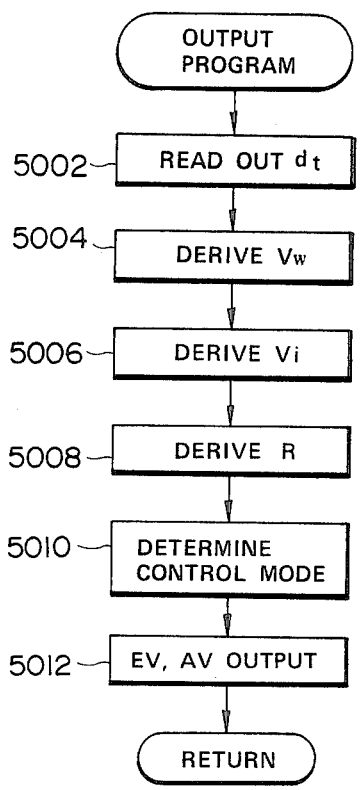

— MAIN PROGRAM
— OUTPUT PROGRAM

FAIL-SAFE SYSTEM IN ANTI-SKID BRAKE CONTROL SYSTEM FOR AUTOMOTIVE VEHICLES

BACKGROUND OF THE INVENTION

The present invention relates generally to an anti-skid brake control system for an automotive vehicle for preventing vehicle wheels from skidding, thereby, optimizing the braking performance of the vehicle. More particularly, the invention relates to a fail-safe system for an anti-skid brake control system, which ensures that the vehicular brake system is rendered manually operable when the anti-skid control malfunctions.

Various kinds of anti-skid automotive brake control systems are now available. Anti-skid brake control systems generally control braking pressure at wheel cylinder or wheel cylinders in order to hold wheel slip relative to vehicle speed as close as possible to an optimal rate. In order to accomplish this, various approaches have been taken in the prior art.

U.S. Pat. No. 4,315,213, issued on Feb. 9, 1982 to Manfred WOLFF, discloses a method for obtaining an acceleration or deceleration signal from a signal proportional to speed and apparatus therefor. The method for obtaining an acceleration or deceleration signal from a signal proportional to the speed consists of storing the n most recently ascertained changes in the speed signal in a memory, and upon ascertainment of a new change to be stored in memory, erasing the change which has been stored the longest, and forming a deceleration or acceleration signal by addition of the stored n changes periodically at intervals of dT. In this method, the occurrence of deceleration or acceleration exceeding the threshold is recognized quickly.

U.S. Pat. No. 4,267,575, issued on May 12, 1981 to Peter BOUNDS, discloses a system, which serves to provide signals to a microcomputer-based control system from which instantaneous values of speed can be computed, includes a wheel-driven alternator which provides an alternating current output whose frequency varies with wheel speed. A signal processor converts this signal to a series of sensor pulses whose width varies inversely with frequency. A sample pulse supplied by a microprocessor sets the period or length of time during which the sensor pulses are examined for each speed calculation cycle of the microprocessor. The sample period pulses are AND-gated with a high-frequency clock signal and also with the sensor pulses to provide a series of marker pulses marking the up and down excursions of the sensor pulses. The marker pulses occurring in each sample period are counted directly in a first counter, and in addition are supplied to a latch circuit and from thence to an AND gate which responds to the first marker pulse in the sample period to count occurrences of the first counter exceeding its capacity. A third counter is also connected to receive the high-frequency clock pulses and counts only the clock pulses occurring after the last marker pulse in the sample period. At the end of the sample period, the counts from all three counters are transferred to the microprocessor which uses this information to compute a value for wheel velocity over the sample period. The system continuously provides the input counts to enable the microprocessor to calculate wheel velocity over each sample period.

In another approach, U.S. Pat. No. 4,384,330 to Toshiro MATSUDA, issued on May 17, 1983 discloses a brake control system for controlling application and release of brake pressure in order to prevent the vehicle from skidding. The system includes a sensing circuit for determining wheel rotation speed, a deceleration detecting circuit for determining the deceleration rate of the wheel and generating a signal when the determined deceleration rate becomes equal to or greater than a predetermined value, a target wheel speed circuit for determining a target wheel speed based on the wheel rotation speed and operative in response to detection of a peak in the coefficient of friction between the vehicle wheel and the road surface, and a control circuit for controlling application and release of brake fluid pressure to wheel cylinders for controlling the wheel deceleration rate. The wheel rotation speed sensing circuit detects the angular velocity of the wheel to produce alternating current sensor signal having a frequency corresponding to the wheel rotation speed. The wheel rotation speed sensor signal value is differentiated to derive the deceleration rate.

Another approach for deriving acceleration has been disclosed in U.S. Pat. No. 3,943,345 issued on Mar. 9, 1976 to Noriyoshi ANDO et al. The system disclosed includes a first counter for counting the number of pulse signals corresponding to the rotational speed of a rotating body, a second counter for counting the number of pulses after the first counter stops counting, and a control circuit for generating an output signal corresponding to the difference between the counts of the first and second counters.

Yet another approach has been taken to derive the wheel rotation speed which will be hereafter referred to as "wheel speed" based on input time data representative of the times at which wheel speed sensor signal pulses are produced. For instance, by latching a timer signal value in response to the leading edge of each sensor signal pulse, the intervals between occurrences of the sensor signal pulses can be measured. The intervals between occurrences of the sensor signal pulses are inversely proportional to the rotation speed of the wheel. Therefore, wheel speed can be derived by finding the reciprocal of the measured intervals. In addition, wheel acceleration and deceleration can be obtained by comparing successive intervals and dividing the obtained difference between intervals by the period of time over which the sensor signals were sampled.

To perform this procedure, it is essential to record the input timing in response to every sensor signal pulse. A difficulty is encountered due to significant variations in the sensor signal intervals according to significant variations in the vehicle speed. In recent years, modern vehicles can be driven at speeds in the range of about 0 km/h to 300 km/h. Sensor signal intervals vary in accordance with this wide speed range. In particular, when the vehicle is moving at a relatively high speed, the input intervals of the sensor signal pulses may be too short for the anti-skid control system to resolve. As accurate sampling of input timing is essential for the proposed approach, errors in the recorded input time data will cause errors or malfunction of the anti-skid brake control system. One possible source of error in sampling the input timing is accidentally missing one or more sensor signal pulses. Such errors are particularly likely to occur when the vehicle and wheel speeds are relatively high and therefore the intervals between adjacent sensor signal pulses are quite short.

U.S. Pat. No. 4,408,290, issued on Oct. 4, 1983 to the common inventor of this invention is intended to perform the foregoing input time data sampling for use in calculation of acceleration and deceleration. In the disclosure of the applicant's prior invention, an acceleration sensor acts on the variable-frequency pulses of a speed sensor signal to recognize any variation of the pulse period thereof and to produce an output indicative of the magnitude of the detected variation to within a fixed degree of accuracy. The durations of groups of pulses are held to within a fixed range by adjusting the number of pulses in each group. The duration of groups of pulses are measured with reference to a fixed-frequency clock pulse signal and the measurement periods of successive groups of equal numbers of pulses are compared. In the difference between pulse group periods is zero or less than a predetermined value, the number of pulses in each group is increased in order to increase the total number of clock pulses during the measurement interval. The number of pulses per group is increased until the difference between measured periods exceeds the predetermined value or until the number of pulses per group reaches a predetermined maximum. Acceleration data calculation and memory control procedure are designed to take into account the variation of the number of pulse per group.

The applicant has already filed an application directed to an anti-skid brake control system which can control a plurality of vehicular wheels independently of each other, which application is pending under U.S. Patent Application Ser. No. 601,295 filed on Apr. 17, 1984, U.S. Pat. No. 4,656,588. The above-identified co-pending application also discloses a fail-safe system in which a plurality of controllers, each adapted to control the brakes for a corresponding vehicular wheel or wheels, monitor one another for malfunction. In the disclosed system, a back-up operation would be performed which actuates the brake system to an application mode in which braking pressure is built up in the wheel cylinder when one of the control systems malfunctions.

Another fail-safe system has been developed by the applicant and disclosed in the Published Japanese Patent Application (Tokkai) Showa 58-63558, published on Apr. 15, 1983. In the disclosed system, each component of the anti-skid control system is monitored in order to detect faulty operation thereof. When failure of a component or components is detected, information concerning the faulty component or components is stored in the fail-safe system. The memory storing the fault-identification data may be accessed later during maintenance.

The present invention concerns an improvement in the fail-safe system. Particularly, the invention concerns an improvement in the fail-safe system disclosed in the foregoing Published Japanese Patent Application No. 58-63558.

SUMMARY OF THE INVENTION

It is an object of the present invention to provide an improved fail-safe system for an anti-skid brake control system which prevents the anti-skid brake control system from malfunctioning even when the fail-safe system itself malfunctions.

Another and more specific object of the invention is to provide a fail-safe system for an anti-skid brake control system, which ensures that when the anti-skid control system and fail-safe system both malfunction, the vehicular brake system is actuated to an application mode in which braking pressure can be built up in the brake cylinders by manual brake operation.

In order to accomplish the above and other objects, a fail-safe system for an anti-skid brake control system, according to the present invention, includes a detector which detects malfunction of one or more components of an anti-skid brake control system, a disabling means responsive to malfunction of the component or components in the anti-skid brake control system for blocking electric power supply to an actuator controlling a pressure control valve, and means associated with the actuator and responsive to operation of the disabling means to operate the actuator to an application mode position in which the pressure control valve allows manual control of the brakes.

According to one aspect of the invention, a fail-safe system for an anti-skid brake control system comprises a hydraulic brake circuit, a pressure control valve disposed in the brake circuit for increasing hydraulic brake pressure in a wheel cylinder in its first position, for decreasing hydraulic brake pressure in the wheel cylinder in its second position and for holding hydraulic brake pressure in the wheel cylinder constant in its third position, an actuator associated with the pressure control valve for operating the pressure control valve among the first, second and third positions according to a control signal, the actuator being connected to an electric power source to receive power supply therefrom, a sensor for detecting wheel speed and producing a second signal indicative of the wheel speed, a detector for detecting faulty operation of the components of the anti-skid brake control system and produce a fault-indicative signal when faulty operation of at least one of the components is detected, and a controller receiving the sensor signal and processing the sensor signal, deriving values of wheel acceleration and slippage, deriving the control signal in accordance with the values, the controller being responsive to the fault-indicative signal to hold the control signal at a value at which the pressure control valve is in the first position and to terminate power supply to the actuator.

BRIEF DESCRIPTION OF THE DRAWINGS

The present invention will be understood more fully from the detailed description given below and from the accompanying drawings of the preferred embodiments of the present invention, which, however, should not be taken to limit the invention to the specific embodiments, but are for explanation and understanding only.

FIG. 19 is a flowchart of a sample control program executed by the controller unit;

FIG. 20 is a flowchart of a timer overflow program executed periodically as an interrupt program of the main program;

FIG. 23 is a flowchart of an output calculation program for deriving EV and V signals for controlling operation mode of the electromagnetic valve according to the valve conditions of FIGS. 4, 5 and 6;

DESCRIPTION TO THE PREFERRED EMBODIMENTS

Figure 1:
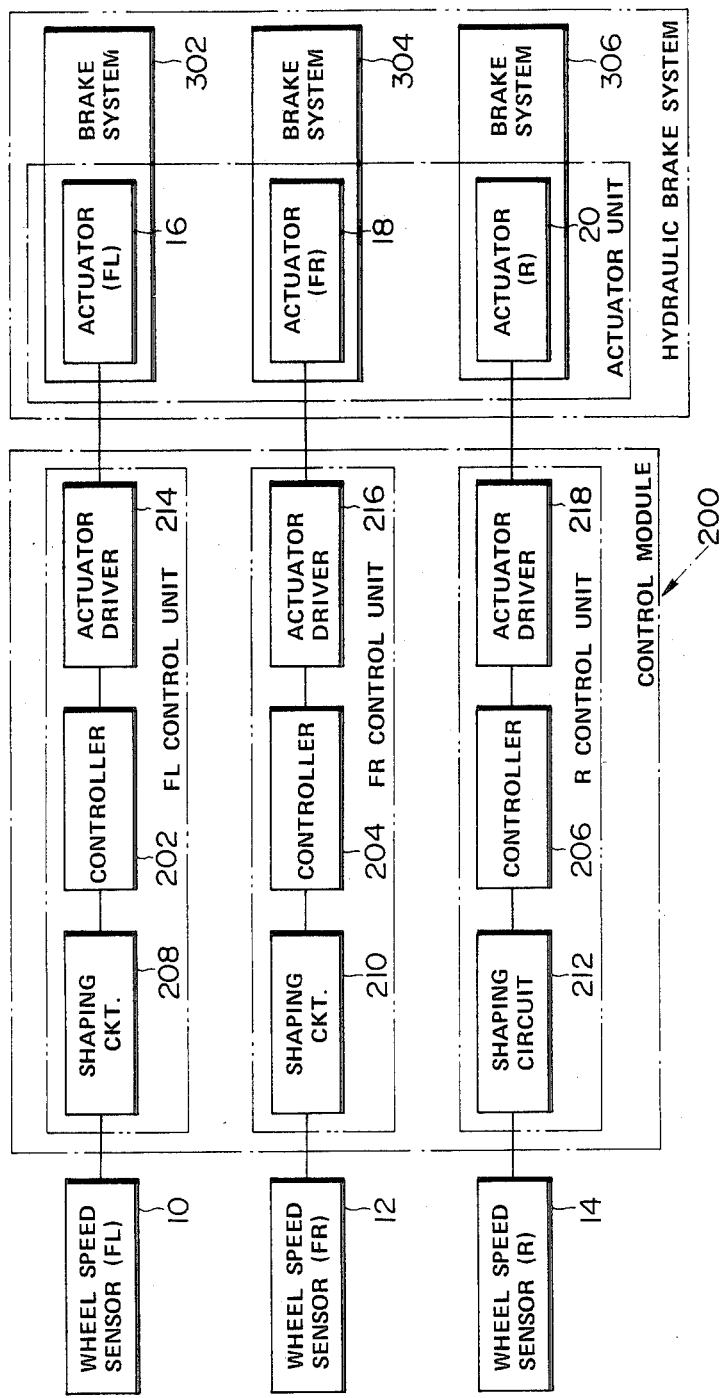
FIG. 1 is a schematic block diagram of the general design of the preferred embodiment of an anti-skid brake control system according to the present invention.

Referring now to the drawings, particularly to FIG. 1, the preferred embodiment of an anti-skid control system according to the present invention includes a control module 200 including a front-left controller unit (FL) 202, a front-right controller unit (FR) 204 and a rear controller unit (R) 206. The controller unit 202 comprises a microprocessor and is adapted to control brake pressure applied to a front left wheel cylinder 30a of a front left hydraulic brake system 302 of an automotive hydraulic brake system 300. Similarly, the controller unit 204 is adapted to control brake pressure applied to the wheel cylinder 34a of a front right wheel (not shown) in the front right hydraulic brake system 304 and the controller unit 206 is adapted to control brake pressure applied to the rear wheel cylinders 38a of the hydraulic rear brake system 306. Respective brake systems 302, 304 and 306 have electromagnetically operated actuators 16, 18 and 20, each of which controls the pressure of working fluid in the corresponding wheel cylinders. By means of the controlled pressure, the wheel cylinders 30a, 34a and 38a apply braking force to brake disc rotors 28, 32 and 36 mounted on the corresponding wheel axles for rotation with the corresponding vehicle wheels via brake shoe assemblies 30, 34 and 38.

Though the shown brake system comprises disc brakes, the anti-skid control system according to the present invention can also be applied to drum-type brake systems.

The controller units 202, 204 and 206 are respectively associated with actuator drive circuits 214, 216 and 218 to control operations of corresponding actuators 16, 18 and 20. In addition, each of the controller units 202, 204 and 206 is connected to a corresponding wheel speed sensor 10, 12 and 14 via shaping circuits 208, 210 and 212 incorporated in the controller 200. Each of the wheel speed sensors 10, 12 and 14 is adapted to produce an alternating-current sensor signal having a frequency related to or proportional to the rotation speed of the corresponding vehicle wheel. Each of the A-C sensor signals is converted by the corresponding shaping circuit 208, 210 and 212 into a rectangular pulse signal which will be hereafter referred to as "sensor pulse signal". As can be appreciated, since the frequency of the A-C sensor signals is proportional to the wheel speed, the frequency of the sensor pulse signal should correspond to the wheel rotation speed and the pulse intervals thereof will be inversely proportional to the wheel rotation speed.

The controller units 202, 204 and 206 operate independently and continuously process the sensor pulse signal to derive control signals for controlling the fluid pressure in each of the wheel cylinders 30a, 34a and 38a in such a way that the slip rate R at each of the vehicle wheels is optimized to shorten the distance required to stop the vehicle, which distance will be hereafter referred to as "braking distance".

In general, each controller unit 202, 204 and 206 monitors receipt of the corresponding sensor pulses so that it can derive the pulse interval between the times of receipt of successive sensor pulses. Based on the derived pulse interval, the controller units 202, 204 and 206 calculate instantaneous wheel speed $V_w$ and instantaneous wheel acceleration or deceleration $a_w$. From these measured and derived values, a target wheel speed $V_i$ is derived, which is an assumed value derived from the wheel speed at which a slip is assumed to be zero or approximately zero. The target wheel speed $V_i$ varies at a constant decelerating rate derived from variation of the wheel speed. The target wheel speed thus corresponds to a vehicle speed which itself is based on variation of the wheel speed. Based on the difference between the instantaneous wheel speed $V_w$ and the target wheel speed $V_i$, a slip rate R is derived. The controller units 202, 204 and 206 determine the appropriate operational mode for increasing, decreasing or holding the hydraulic brake pressure applied to the wheel cylinders 30a, 34a and 38a. The control mode in which the brake pressure is increased will be hereafter referred to as "application mode". The control mode in which the brake pressure is decreased will be hereafter referred to as "release mode". The mode in which the brake pressure is held essentially constant will be hereafter referred to as "hold mode". The anti-skid control operation consists of a loop of the application mode, hold mode, release mode and hold mode. This loop is repeated throughout the anti-skid brake control operation cyclically. One cycle of the loop of the control variation will be hereafter referred to as "skid cycle".

Figure 2:
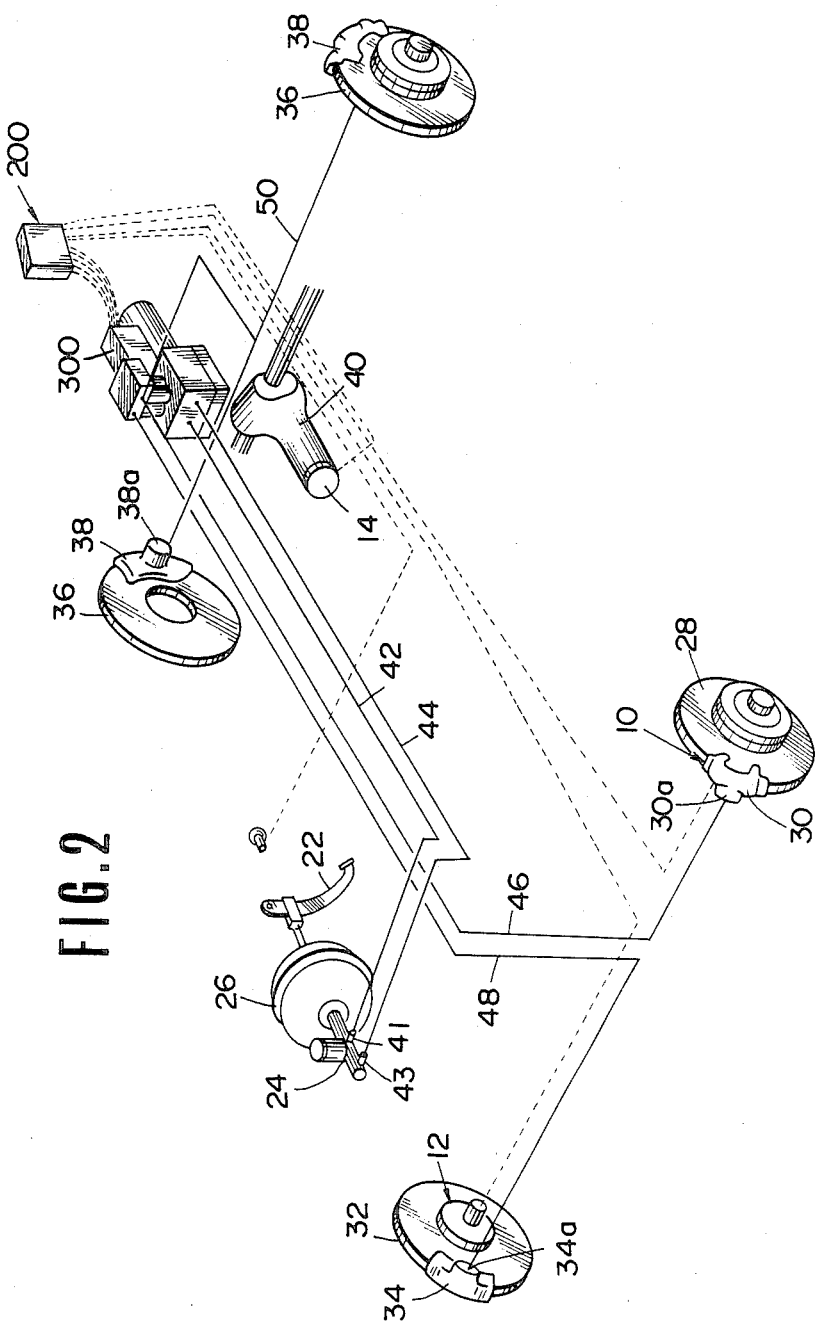
FIG. 2 is a perspective illustration of the hydraulic circuits of the anti-skid brake system according to the present invention.

FIG. 2 shows portions of the hydraulic brake system of an automotive vehicle to which the preferred embodiment of the anti-skid control system is applied. The wheel speed sensors 10 and 12 are respectively provided adjacent the brake disc rotor 28 and 32 for rotation therewith so as to produce sensor signals having frequencies proportional to the wheel rotation speed and variable in accordance with variation of the wheel speed. On the other hand, the wheel speed sensor 14 is provided adjacent a propeller shaft near the differential gear box or drive pinion shaft 116 for rotation therewith (See FIG. 8). Since the rotation speeds of the left and right rear wheels are free to vary independently depending upon driving conditions due to the effect of the differential gear box 40, the rear wheel speed detected by the rear wheel speed sensor 14 is the average of the speeds of the left and right wheels. Throughout the specification, "rear wheel speed" will mean the average rotation speed of the left and right rear wheels.

As shown in FIG. 2, the actuator unit 300 is connected to a master wheel cylinder 24 via primary and secondary outlet ports 41 and 43 thereof and via pressure lines 44 and 42. The master wheel cylinder 24 is, in turn, associated with a brake pedal 22 via a power booster 26 which is adapted to boost the braking force applied to the brake pedal 22 before applying same to the master cylinder. The actuator unit 300 is also connected to wheel cylinders 30a, 34a and 38a via brake pressure lines 46, 48 and 50.

Figure 3:
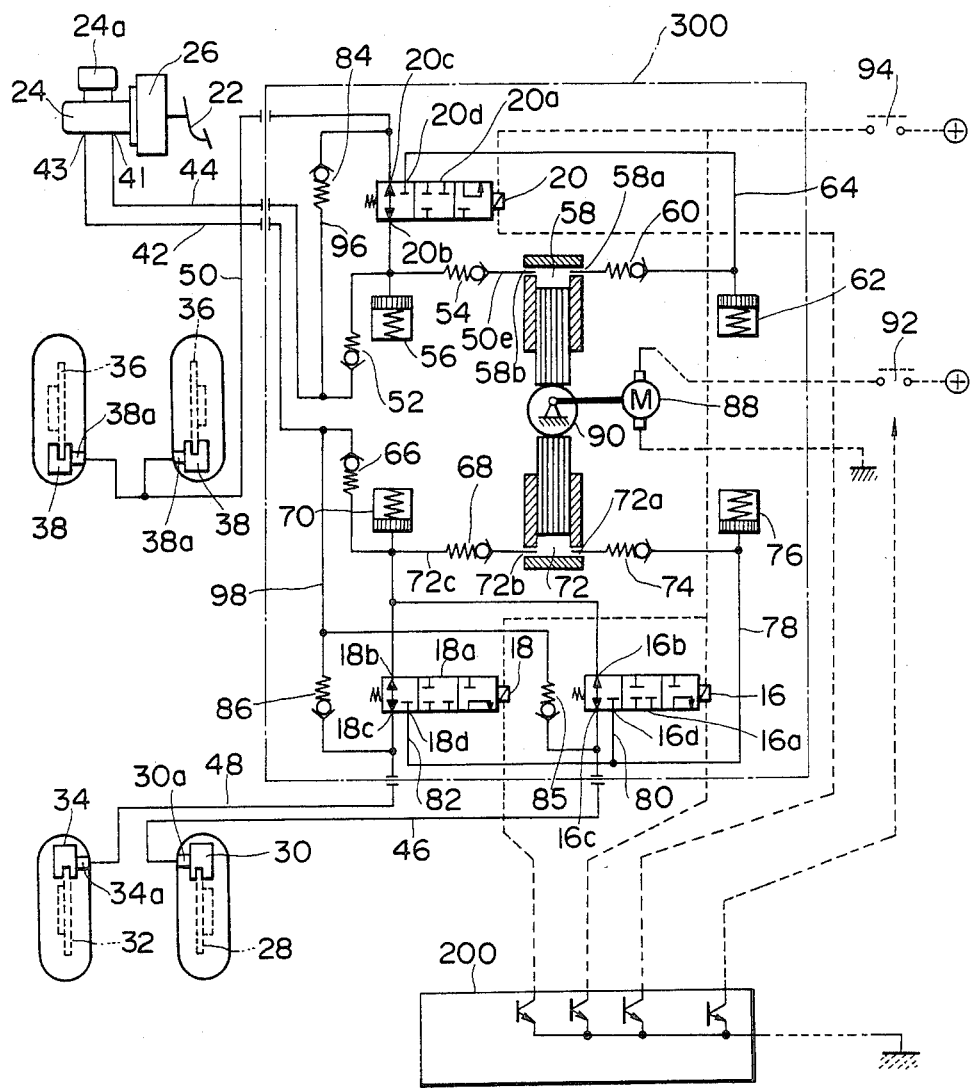
FIG. 3 is a circuit diagram of the hydraulic circuits performing the anti-skid control according to the present invention.

The circuit lay-out of the hydraulic brake system circuit will be described in detail below with reference to FIG. 3 which is only an example of the hydraulic brake system to which the preferred embodiment of the anti-skid control system according to the present invention can be applied, and so it should be appreciated that it is not intended to limit the hydraulic system to the embodiment shown. In FIG. 3, the secondary outlet port 43 is connected to the inlet ports 16b and 18b of electromagnetic flow control valves 16a and 18a, the respective outlet ports 16c and 18c of which are connected to corresponding left and right wheel cylinders 30a and 34a, via the secondary pressure lines 46 and 48. The primary outlet port 41 is connected to the inlet port 20b of the electromagnetic valve 20a, the outlet port 20c of which is connected to the rear wheel cylinders 38a, via a primary pressure line 50. The electromagnetic valves 16a, 18a and 20a also have drain ports 16d, 18d and 20d. The drain ports 16d and 18d are connected to the inlet ports 72a of a fluid pump 90 via drain passages 80, 82 and 78. The fluid pump 90 is associated with an electric motor 88 to be driven by the latter which is, in turn, connected to a motor relay 92, the duty cycle of which is controlled by means of a control signal from the control module 200. While the motor relay 92 is energized to be turned ON, the motor 88 is in operation to drive the fluid pump 90. The drain port 20d of the electromagnetic flow control valve 20a is connected to the inlet port 58a of the fluid pump 90 via a drain passage 64.

The outlet ports 72b and 58b are respectively connected to the pressure lines 42 and 44 via a return passages 72c and 58c. The outlet ports 16c, 18c and 20c of respective electromagnetic flow control valves 16a, 18a and 20a are connected to corresponding wheel cylinders 30a, 34a and 38a via braking lines 46, 48 and 50. Bypass passages 96 and 98 are provided to connect the braking pressure lines 46 and 48, and 50 respectively to the pressure lines 42 and 44, bypassing the electromagnetic flow control valves.

Pump pressure check valves 52 and 66 are installed in the pressure lines 42 and 44. Each of the pump pressure check valves 66 and 52 is adapted to prevent the working fluid pressurized by the fluid pump 90 from transmitting pressure surges to the master cylinder 24. Since the fluid pump 90 is designed for quick release of the braking pressure in the braking pressure lines 46, 48 and 50 and thus releasing the wheel cylinders 30a, 34a and 38a from the braking pressure, it is driven upon release of the brake pedal. This would result in pressure surges in the working fluid from the fluid pump 90 to the master cylinder 24 if the pump pressure check valves 66 and 52 were not provided. The pump pressure check valves 66 and 52 serve as one-way check valves allowing fluid flow from the master cylinder 24 to the inlet ports 16b, 18b and 20b of the electromagnetic valves 16a, 18a and 20a. Pressure accumulators 70 and 56 are installed in the pressure lines 42 and 44, which pressure accumulators serve to accumulate fluid pressure generated at the outlet ports 72b and 58b of the fluid pump 90 while the inlet ports 16b, 18b and 20b are closed. Toward this end, the pressure accumulators 70 and 56 are connected to the outlet ports 72b and 58b of the fluid pump 90 via the return passages 72c and 58c. Outlet valves 68 and 54 are one-way check valves allowing one-way fluid communication from the fluid pump to the pressure accumulators. These outlet valves 68 and 54 are effective for preventing the pressure accumulated in the pressure accumulators 70 and 56 from surging to the fluid pump when the pump is deactivated. In addition, the outlet valves 68 and 54 are also effective to prevent the pressurized fluid flowing through the pressure lines 42 and 44 from flowing into the fluid pump 90 through the return passages 72c and 58c.

Inlet check valves 74 and 60 are inserted in the drain passages 78 and 64 for preventing surge flow of the pressurized fluid in the fluid pump 90 to the electromagnetic flow control valves 16a, 18a and 20a after the braking pressure in the wheel cylinders is released. The fluid flowing through the drain passages 78 and 64 is temporarily retained in fluid reservoirs 76 and 62 connected to the former.

Bypass check valves 85, 86 and 84 are inserted in the bypass passages 98 and 96 for preventing the fluid in the pressure lines 42 and 44 from flowing to the braking pressure lines 46, 48 and 50 without first passing through the electromagnetic flow control valves 16a, 18a and 20a. On the other hand, the bypass check valves 85, 86 and 84 are adapted to permit fluid flow from the braking pressure line 46, 48 and 50 to the pressure lines 42 and 44 when the master cylinder 24 is released and thus the line pressure in the pressure lines 42 and 44 becomes lower than the pressure in the braking pressure lines 46, 48 and 50.

The electromagnetic flow control valves 16a, 18a and 20a are respectively associated with the actuators 16, 18 and 20 to be controlled by means of the control signals from the control module 200. The actuators 16, 18 and 20 are all connected to the control module 200 via an actuator relay 94, which thus controls the energization and deenergization of them all. Operation of the electromagnetic valve 16a in cooperation with the actuator 16 will be illustrated with reference to FIGS. 4, 5 and 6, in particular illustrating the application mode, hold mode and release mode, respectively.

It should be appreciated that the operation of the electromagnetic valves 18a and 20a are substantially the same as that of the valve 16a. Therefore, disclosure of the valve operations of the electromagnetic valves 18a and 20a is omitted in order to avoid unnecessary repetition and for simplification of the disclosure.

APPLICATION MODE

In this position, the actuator 16 remains deenergized. An anchor of the electromagnetic valve 16a thus remains in its initial position allowing fluid flow between the inlet port 16b and the outlet port 16c so that the pressurized fluid supplied from the master cylinder 24 via the pressure line 42 may flow to the left front wheel cylinder 30a via the braking pressure line 46. In this valve position, the drain port 16d is closed to block fluid flow from the pressure line 42 to the drain passage 78. As a result, the line pressure in the braking pressure line 46 is increased in proportion to the magnitude of depression of the brake pedal 22 and thereby the fluid pressure in the left front wheel cylinder 30a is increased correspondingly.

In this case, when the braking force applied to the brake pedal is released, the line pressure in the pressure line 42 drops due to return of the master cylinder 24 to its initial position. As a result, the line pressure in the braking pressure line 46 becomes higher than that in the pressure line 42 and so opens the bypass valve 85 to permit fluid flow through the bypass passage 98 to return the working fluid to the fluid reservoir 24a of the master cylinder 24.

In the preferring construction, the pump pressure check valve 66, normally serving as a one-way check valve for preventing fluid flow from the electromagnetic valve 16a to the master cylinder 24, becomes wide-open in response to drop of the line pressure in the pressure line below a given pressure. This allows the fluid in the braking pressure line 46 to flow backwards through the electromagnetic valve 16a and the pump pressure check valve 66 to the master cylinder 24 via the pressure line 42. This function of the pump pressure check valve 66 facilitates full release of the braking pressure in the wheel cylinder 30a.

For instance, the bypass valve 85 is rated at a given set pressure, e.g. 2 kg/cm$^2$ and closes when the pressure difference between the pressure line 42 and the braking pressure line 46 drops below the set pressure. As a result, fluid pressure appoximating the bypass valve set pressure tends to remain in the braking pressure line 46, preventing the wheel cylinder 30a from returning to the fully released position. In order to avoid this, in the shown embodiment, the one-way check valve function of the pump pressure check valve 66 is disabled when the line pressure in the pressure line 42 drops below a predetermined pressure, e.g. 10 kg/cm$^2$. When the line pressure in the pressure line 42 drops below the predetermined pressure, a bias force normally applied to the pump pressure check valve 66 is released, freeing the valve to allow fluid flow from the braking pressure line 46 to the master cylinder 24 via the pressure line 42.

HOLD MODE

In this control mode, the control signal affecting the hold mode is applied to the actuator 16 to position the anchor closer to the actuator 16 than in the previous case. As a result, the inlet port 16b and the drain port 16d are closed to block fluid communication between the pressure line 42 and the braking pressure line 46 and between the braking pressure line and the drain passage 78. Therefore, the fluid pressure in the braking pressure line 46 is held at the level extant at the moment the actuator is operated by the control signal.

In this case, the fluid pressure applied through the master cylinder flows through the pressure check valve 66 to the pressure accumulator 70.

RELEASE MODE

In this control mode, the control signal affecting the release mode is applied to the actuator 16 to shift the anchor all the way toward the actuator 16. As a result, the drain port 16d is opened to establish fluid communication between the drain port 16d and the outlet port 16c. At this time, the fluid pump 90 serves to facilitate fluid flow from the braking pressure line 46 to the drain passage 78. The fluid flowing through the drain passage is partly accumulated in the fluid reservoir 76 and the remainder flows to the pressure accumulator 70 via the check valves 60 and 54 and the fluid pump 90.

It will be appreciated that, even in this release mode, the fluid pressure in the pressure line 42 remains at a level higher or equal to that in the braking pressure line 46, so that fluid flow from the braking pressure line 46 to the pressure line 42 via the bypass passage 98 and via the bypass check valve 85 will never occur.

In order to resume the braking pressure in the wheel cylinder (FL) 30a after once the braking pressure is reduced by positioning the electromagnetic valve 16a in the release position, the actuator 16 is again deenergized. The electromagnetic valve 16a is thus returns to its initial position to allow the fluid flow between the inlet port 16b and the outlet port 16c so that the pressurized fluid may flow to the left front wheel cylinder 30a via the braking pressure line 46. As set forth the drain port 16d is closed to block fluid flow from the pressure line 42 to the drain passage 78.

As a result, the pressure accumulator 70 is connected to the left front wheel cylinder 30a via the electromagnetic valve 16a and the braking pressure line 46. The pressurized fluid in the pressure accumulator 70 is thus supplied to the wheel cylinder 30a so as to resume the fluid pressure in the wheel cylinder 30a.

At this time, as the pressure accumulator 70 is connected to the fluid reservoir 76 via the check valves 60 and 54 which allow fluid flow from the fluid reservoir to the pressure accumulator, the extra amount of pressurized fluid may be supplied from the fluid reservoir.

The design of the wheel speed sensors 10, 12 and 14 employed in the preferred embodiment of the anti-skid control system will be described in detail with reference to FIGS. 7 to 9.

Figure 7:
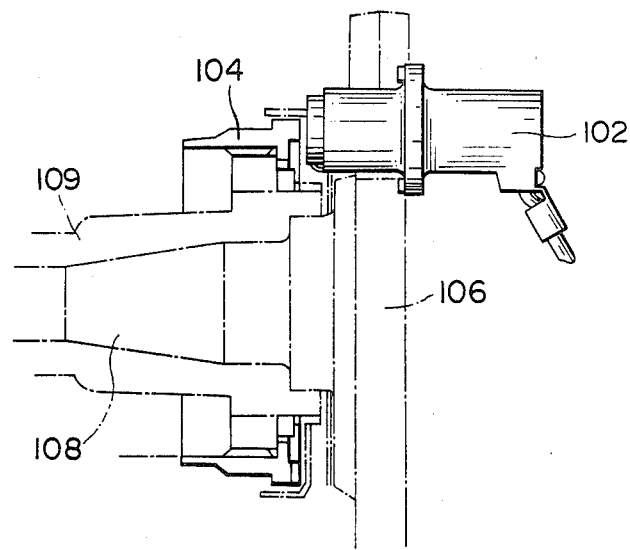
FIG. 7 is a perspective view of a wheel speed sensor adapted to detect the speed of a front wheel.

FIG. 7 shows the structure of the wheel speed sensor 10 for detecting the rate of rotation of the left front wheel. The wheel speed sensor 10 generally comprises a sensor rotor 104 adapted to rotate with the vehicle wheel, and a sensor assembly 102 fixedly secured to the shim portion 106 of the knuckle spindle 108. The sensor rotor 104 is fixedly secured to a wheel hub 109 for rotation with the vehicle wheel.

Figure 9:
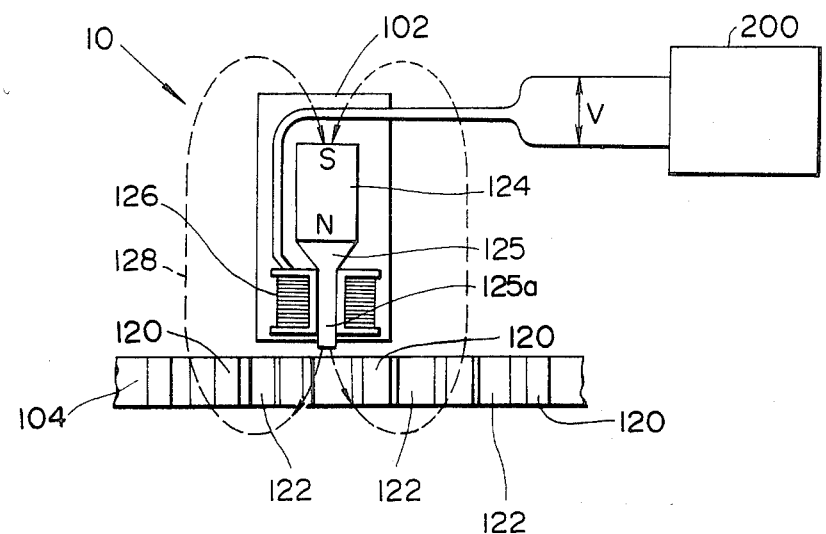
FIG. 9 is an explanatory illustration of the wheel speed sensors of FIGS. 7 and 8.
Figure 10:
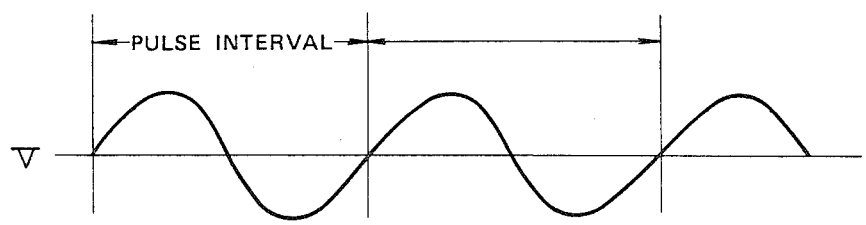
FIG. 10 shows the waveform of an alternating current sensor signal produced by the wheel speed sensor.

As shown in FIG. 9, the sensor rotor 104 is formed with a plurality of sensor teeth 120 at regular angular intervals. The width of the teeth 120 and the grooves 122 therebetween are equal in the shown embodiment and define a unit angle of wheel rotation. The sensor assembly 102 comprises a magnetic core 124 aligned with its north pole (N) near the sensor rotor 104 and its south pole (S) distal from the sensor rotor. A metal element 125 with a smaller diameter section 125a is attached to the end of the magnetic core 124 nearer the sensor rotor. The free end of the metal element 125 faces the sensor teeth 120. An electromagnetic coil 126 encircles the smaller diameter section 125a of the metal element. The electromagnetic coil 126 is adapted to detect variations in the magnetic field generated by the magnetic core 124 to produce an alternating-current sensor signal as shown in FIG. 10. That is, the metal element and the magnetic core 124 form a kind of proximity switch which adjusts the magnitude of the magnetic field depending upon the distance between the free end of the metal element 125 and the sensor rotor surface. Thus, the intensity of the magnetic field fluctuates in relation to the passage of the sensor teeth 120 and accordingly in relation to the angular velocity of the wheel.

It should be appreciated that the wheel speed sensor 12 for the right front wheel has the substantially the same structure as the set forth above. Therefore, explanation of the structure of the right wheel speed sensor 12 will be omitted in order to avoid unnecessary repetition in the disclosure and in order to simplify the description.

Figure 8:
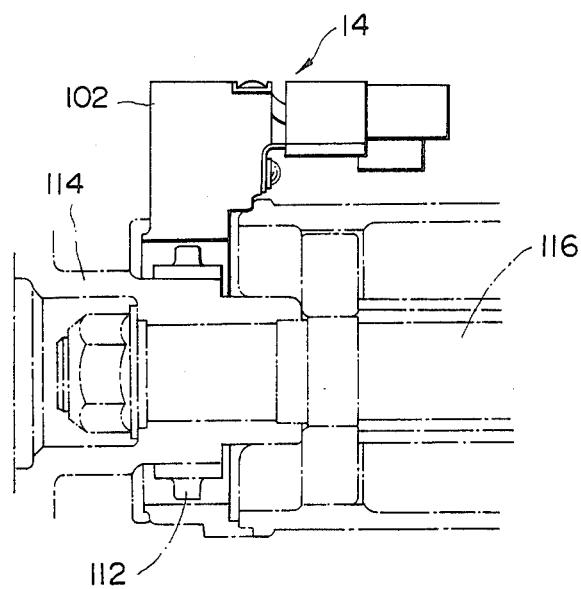
FIG. 8 is a side elevation of a wheel speed sensor adapted to detect the speed of a rear wheel.

FIG. 8 shows the structure of the rear wheel speed sensor 14. As with the aforementioned left front wheel speed sensor 10, the rear wheel speed sensor 14 comprises a sensor rotor 112 and a sensor assembly 102. The sensor rotor 112 is associated with a companion flange 114 which is, in turn, rigidly secured to a drive shaft 116 for rotation therewith. Thus, the sensor rotor 112 rotates with the drive shaft 116. The sensor assembly 102 is fixed to a final drive housing or a differential gear box (not shown).

Each of the sensor assemblies applied to the left and right front wheel speed sensors and the rear wheel sensor is adapted to output an alternating-current sensor signal having a frequency proportion to or corresponding to the rotational speed of the corresponding vehicle wheel. The electromagnetic coil 126 of each of the sensor assemblies 102 is connected to the control module 200 to supply the sensor signals thereto.

As set forth above, the control module 200 comprises the controller unit (FL) 202, the controller unit (FR) 204 and the controller unit (R) 206, each of which comprises a microcomputer. Therefore, the wheel speed sensors 10, 12 and 14 are connected to corresponding controller units 202, 204 and 206 and send their sensor signals thereto. Since the structure and operation of each of the controller units is substantially the same as that of the others, the structure and operation of only the controller unit 202 for performing the anti-skid brake control for the front left wheel cylinder will be explained in detail.

Figure 11:
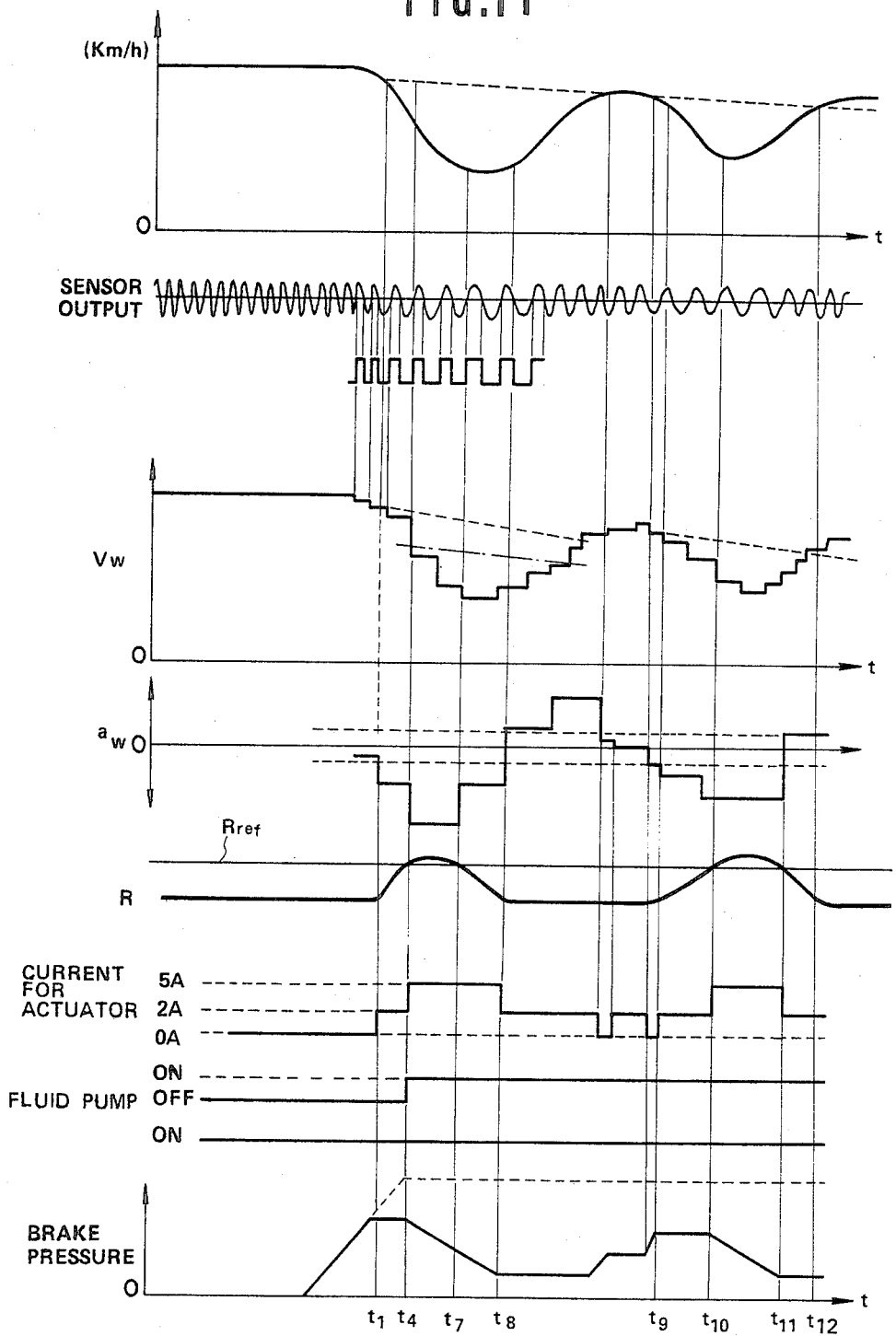
FIG. 11 is a timing chart for the anti-skid control system.

FIG. 11 is a timing chart of the anti-skid control performed by the controller unit 202. As set forth above, the alternating-current sensor signal output from the wheel speed sensor 10 is converted into a rectangular pulse train, i.e. as the sensor pulse signal mentioned above. The controller unit 202 monitors occurrences of sensor pulses and measures the intervals between individual pulses or between the first pulses of groups of relatively-high-frequency pulses. Pulses are so grouped that the measured intervals will exceed a predetermined value, which value will be hereafter referred to as "pulse interval threshold".

The wheel rotation speed $V_w$ is calculated in response to each sensor pulse. As is well known, the wheel speed is generally inversely proportional to the intervals between the sensor pulses, and accordingly, the wheel speed $V_w$ is derived from the interval between the last sensor pulse input time and the current sensor pulse input time. A target wheel speed is designated $V_i$ and the resultant wheel speed is designated $V_w$. In addition, the slip rate is derived from the rate of change of the wheel speed and an projected speed $V_v$ which is estimated from the wheel speed at the moment the brakes are applied based on the assumption of a continuous, linear deceleration without slippage. In general, the target wheel speed $V_i$ is derived from the wheel speed of the last skid cycle during which the wheel deceleration rate was equal to or less than a given value which will be hereafter referred to as "deceleration threshold $a_{ref}$", and the wheel speed of the current skid cycle, and by estimating the rate of change of the wheel speed between wheel speeds at which the rate of deceleration is equal to or less than the deceleration threshold. In practice, the first target wheel speed $V_i$ is derived based on the projected speed $V_v$ which corresponds to a wheel speed at the initial stage of braking operation and at which wheel deceleration exceeds a predetermined value, e.g. $-1.2$ G, and a predetermined deceleration rate, for example 0.4 G. The subsequent target wheel speed $V_i$ is derived based on the projected speeds $V_v$ in last two skid cycles. For instance, the deceleration rate of the target wheel speed $V_i$ is derived from a difference of the projected speeds $V_v$ in the last two skid cycle and a period of time in which wheel speed varies from the first projected speed to the next projected speed. Based on the last projected speed and the deceleration rate, the target wheel speed in the current skid cycle is derived.

The acceleration and deceleration of the wheel is derived based on input times of the three successive sensor pulses. Since the interval of the adjacent sensor signal pulses corresponds to the wheel speed, and the wheel speed is a function of the reciprocal of the interval, by comparing adjacent pulse-to-pulse intervals, a value corresponding to the variation or difference of the wheel speed may be abstained. The resultant may be divided by the period of time to obtain the wheel acceleration and deceleration at the unit time. Therefore, the acceleration or deceleration of the wheel is derived from the following equation:

$$a_w = \left(\frac{1}{C-B} - \frac{1}{B-A}\right) / \left(\frac{C-A}{2}\right) \quad (1)$$

where A, B and C are the input times of the sensor pulses in the order given.

On the other hand, the slip rate R is a rate of difference of wheel speed relative to the vehicle speed which is assumed as substantially corresponding to the target wheel speed. Therefore, in the shown embodiment, the target wheel speed $V_i$ is taken as variable or parameter indicative of the assumed or projected vehicle speed. The slit rate R can be obtained by dividing a difference between the target wheel speed $V_i$ and the instantaneous wheel speed $V_w$ by the target wheel speed. Therefore, in addition, the slip rate R is derived by solving the following equation:

$$R = \frac{V_i - V_w}{V_i} \quad (2)$$

Finally, the controller unit 202 determines the control mode, i.e., release mode, hold mode and application mode from the slip rate R and the wheel acceleration or deceleration $a_w$.

General operation of the controller unit 202 will be briefly explained herebelow with reference to FIG. 11. Assuming the brake is applied at $t_0$ and the wheel deceleration $a_w$ exceeds the predetermined value, e.g. 1.2 G at a time $t_1$, the controller unit 202 starts to operate at a time $t_1$. The first sensor pulse input time ($t_1$) is held in the controller unit 202. Upon receipt of the subsequent sensor pulse at a time $t_2$, the wheel speed $V_w$ is calculated by deriving the current sensor pulse period ($dt = t_2 - t_1$). In response to the subsequently received sensor pulses at times $t_3$, $t_4$..., the wheel speed values $V_{w2}$, $V_{w3}$... are calculated.

On the other hand, at the time $t_1$, the instantaneous wheel speed is taken as the projected speed $V_v$. Based on the projected speed $V_v$ and the predetermined fixed value, e.g. 0.4 G, the target wheel speed $V_i$ decelerating at the predetermined deceleration rate 0.4 G is derived.

In anti-skid brake control, the braking force applied to the wheel cylinder is to be so adjusted that the peripheral speed of the wheel, i.e. the wheel speed, during braking is held to a given ratio, e.g. 85% to 80% of the vehicle speed. Therefore, the slip rate R has to be maintained below a given ratio, i.e., 15% to 10%. In the preferred embodiment, the control system controls the braking force so as to maintain the slip rate at about 15%. Therefore, a reference value $R_{ref}$ to be compared with the slip rate R is determined at a value at 85% of the projected speed $V_v$. As will be appreciated, the reference value is thus indicative of a slip rate threshold, which will be hereafter referred to "slip rate threshold $R_{ref}$" throughout the specification and claims, and varies according to variation of the target wheel speed.

Figure 4:
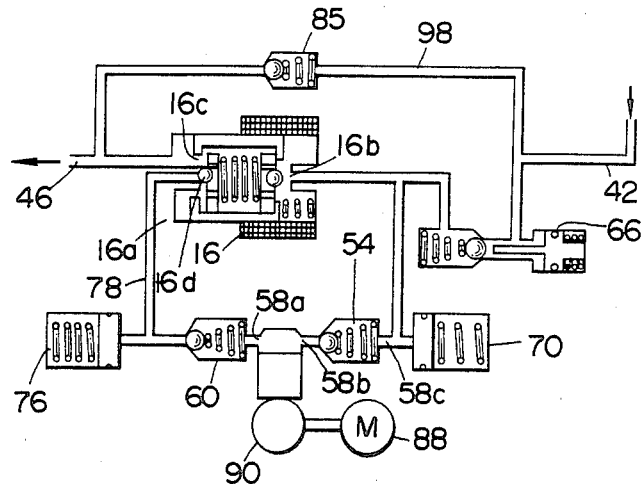
FIG. 4 is an illustration of the operation of an electromagnetic flow control valve employed in the hydraulic circuit, which valve has been shown in an application mode for increasing the fluid pressure in a wheel cylinder.
Figure 5:
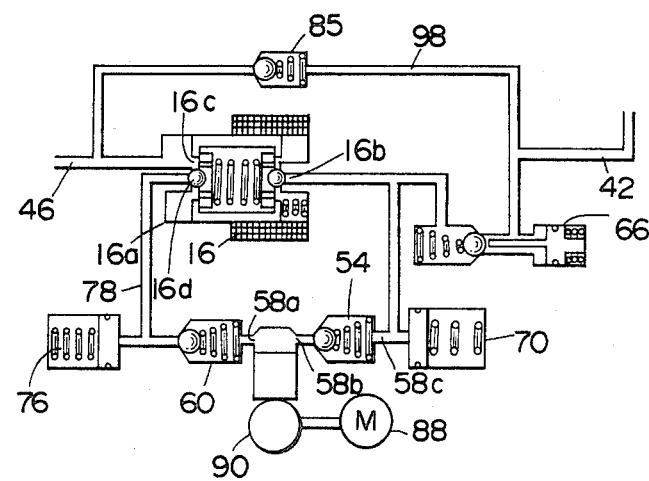
FIG. 5 is a view similar to FIG. 4 but of the valve in a hold mode in which the fluid pressure in the wheel cylinder is held at a substantially constant value.
Figure 6:
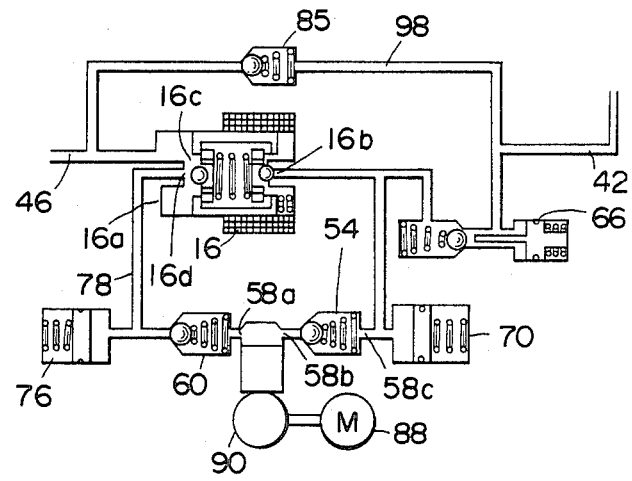
FIG. 6 is a view similar to FIG. 4 but of the valve in a release mode in which the fluid pressure in the wheel cylinder is reduced.

In practical brake control operation performed by the preferred embodiment of the anti-skid control system according to the present invention, the electric current applied to the actuator attains a limited value, e.g., 2 A to place the electromagnetic valve 30a in the hold mode as shown in FIG. 5 when the wheel speed remains inbetween the target wheel speed $V_i$ and the slip rate threshold $R_{ref}$. When the slip rate derived from the target wheel speed $V_i$ and the wheel speed $V_w$ becomes equal to or larger than the slip rate threshold $R_{ref}$, then the supply current to the actuator 16 is increased to a maximum value, e.g. 5 A to place the electromagnetic valve in the release mode as shown in FIG. 6. By maintaining the release mode, the wheel speed $V_w$ is recovered to the target wheel speed. When the wheel speed is thus recovered or resumed so that the slip rate R at that wheel speed becomes equal to or less than the slip rate threshold $R_{ref}$, then the supply current to the actuator 16 is dropped to the limited value, e.g. 2 A to return the electromagnetic valve 30a to the hold mode. By holding the reduced fluid pressure in the wheel cylinder, the wheel speed $V_w$ is further resumed to the target wheel speed $V_i$. When the wheel speed $V_w$ is resumed equal to or higher than the target wheel speed $V_i$, the supply current is further dropped to zero for placing the electromagnetic valve in the application mode as shown in FIG. 4. The electromagnetic valve 30a is maintained in the application mode until the wheel speed is decelerated at a wheel speed at which the wheel deceleration becomes equal to or slightly more than the deceleration threshold $R_{ref} - 1.2$ G. At the same time, the projected speed $V_v$ is again derived with respect to the wheel speed at which the wheel deceleration $a_w$ becomes equal to or slightly larger than the deceleration threshold $a_{ref}$. From a difference of speed of the last projected speed and the instant projected speed and the period of time from a time obtaining the last projected speed to a time obtaining the instant projected speed, a deceleration rate of the target wheel speed $V_i$ is derived. Therefore, assuming the last projected speed is $V_{v1}$, the instant projected speed is $V_{v2}$, and the period of time is $T_v$, the target wheel speed $V_i$ can be obtained from the following equation:

$$V_i = V_{v2} - (V_{v1} - V_{v2})/T_v \times t_w$$

where $t_e$ is an elapsed time from the time at which the instant projected speed $V_{v2}$ is obtained.

Based on the input timing to $t_1$, $t_2$, $t_3$, $t_4$..., deceleration rate $a_w$ is derived from the foregoing equation (1). In addition, the projected speed $V_v$ is estimated as a function of the wheel speed $V_w$ and rate of change thereof. Based on the instantaneous wheel speeds $V_{w1}$ at which the wheel deceleration is equal to or less than the deceleration threshold $a_{ref}$ and the predetermined fixed value, e.g. 0.4 G for the first skid cycle of control operation, the target wheel speed $V_i$ is calculated. According to equation (2), the slip rate R is calculated, using successive wheel speed values $V_{w1}$, $V_{w2}$, $V_{w3}$... as parameters. The derived slip rate R is compared with the slip rate threshold $R_{ref}$. As the wheel speed $V_w$ drops below the projected speed $V_v$ at the time $t_1$, the controller unit 202 switches the control mode from the application mode to the hold mode. Assuming also that the slip rate R exceeds the slip rate threshold at the time $t_4$, then the controller unit 202 switches the control mode to the release mode to release the fluid pressure at the wheel cylinder.

Upon release of the brake pressure in the wheel cylinder, the wheel speed $V_w$ recovers, i.e. the slip rate R drops until it is smaller than the slip rate threshold at time $t_7$. The controller unit 202 detects when the slip rate R is smaller than the slip rate threshold $R_{ref}$ and switches the control mode from release mode to the hold mode.

By maintaining the brake system in the hold mode in which reduced brake pressure is applied to the wheel cylinder, the wheel speed increases until it reaches the projected speed as indicated by the intersection of the dashed line ($V_v$) and the solid trace in the graph of $V_w$ in FIG. 11. When the wheel speed $V_w$ becomes equal to the target wheel speed $V_i$ (at a time $t_8$), the controller unit 202 switches the control mode from the hold mode to the application mode.

As can be appreciated from the foregoing description, the control mode will tend to cycle through the control modes in the order application mode, hold mode, release mode and hold mode, as exemplified in the period of time from $t_1$ to $t_8$. This cycle of variation of the control modes will be referred to hereafter as "skid cycle". Practically speaking, there will of course be some hunting and other minor deviations from the standard skid cycle.

The projected speed $V_v$, which is meant to represent ideal vehicle speed behavior, at time $t_1$ can be obtained directly from the wheel speed $V_w$ at that time since zero slip is assumed. At the same time, the deceleration rate of the vehicle will be assumed to be a predetermined fixed value or the appropriate one of a family thereof, in order to enable calculation of the target wheel speed for the first skid cycle operation. Specifically, in the shown example, the projected speed $V_v$ at the time $t_1$ will be derived from the wheel speed $V_{w1}$ at that time. Using the predetermined deceleration rate, the projected speed will be calculated at each time the wheel deceleration $a_w$ in the application mode reaches the deceleration threshold $a_{ref}$.

At time $t_9$, the wheel deceleration $a_w$ becomes equal to or slightly larger than the deceleration threshold $a_{ref}$, then the second projected speed $V_{v2}$ is obtained at a value equal to the instantaneous wheel speed $V_w$ at the time $t_9$. According to the above-mentioned equation, the deceleration rate da can be obtained $$da = (V_{v1} - V_{v2})/(t_9 - t_1)$$

Based on the derived deceleration rate da, the target wheel speed $V_i'$ for the second skid cycle of control operation is derived by:

$$V_i' - V_{v2} - da \times t_e$$

Based on the derived target wheel speed, the slip rate threshold $R_{ref}$ for the second cycle of control operation is also derived. As will be appreciated from FIG. 11, the control mode will be varied during the second cycle of skid control operation, to hold mode at time $t_9$ at which the wheel deceleration reaches the deceleration threshold $a_{ref}$ as set forth above, to release mode at time $t_{10}$ at which the slip rate R reaches the slip rate threshold $R_{ref}$, to hold mode at time $t_{11}$ at which the slip rate R is recovered to the slip rate threshold $R_{ref}$, and to application mode at time $t_{12}$ at which the wheel speed $V_w$ recovered or resumed to the target wheel speed $V_i'$. Further, it should be appreciated that in the subsequent cycles of the skid control operations, the control of the operational mode of the electromagnetic valve as set forth with respect to the second cycle of control operation, will be repeated.

Relating the above control operations to the structure of FIGS. 3 through 6, when application mode is used, no electrical current is applied to the actuator of the electromagnetic valve 16a so that the inlet port 16b communicates with the outlet port 16c, allowing fluid flow between the pressure passage 42 and the brake pressure line 46. A limited amount of electrical current (e.g. 2A) is applied at times $t_1$, $t_7$, $t_9$ and $t_{11}$, so as to actuate the electromagnetic valve 16a to its limited stroke position by means of the actuator 16, and the maximum current is applied to the actuator as long as the wheel speed $V_w$ is not less than the projected speed and the slip rate is greater than the slip rate threshold $R_{ref}$. Therefore, in the shown example, the control mode is switched from the application mode to the hold mode at time $t_1$ and then to the release mode at time $t_4$. At time $t_7$, the slip rate increases back up to the slip rate threshold $R_{ref}$, so that the control mode returns to the hold mode, the actuator driving the electromagnetic valve 16a to its central holding position with the limited amount of electrical current as the control signal. When the wheel speed $V_w$ finally returns to the level of the target wheel speed $V_i$ at time $t_8$, the actuator 16 supply current is cut off so that the elctromagnetic valve 16a returns to its rest position in order to establish fluid communication between the pressure line 42 and the braking pressure line 46 via inlet and outlet ports 16b and 16c.

Figure 12:
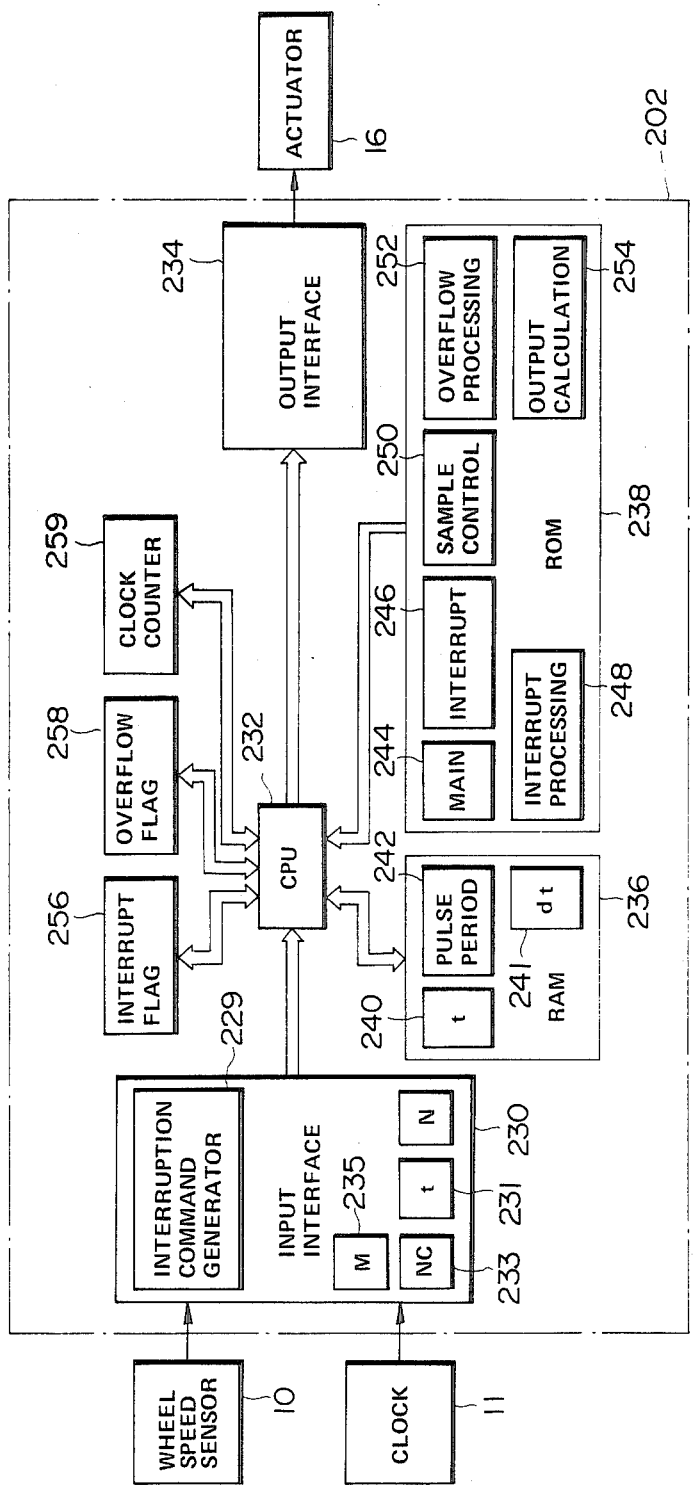
FIG. 12 is a block diagram of the preferred embodiment of a controller unit in the anti-skid brake control system according to the present invention.

Referring to FIG. 12, the controller unit 202 includes an input interface 230, CPU 232, an output interface 234, RAM 236 and ROM 238. The input interface 230 includes an interrupt command generator 229 which produces an interrupt command in response to every sensor pulse. In ROM, a plurality of programs including a main program (FIGS. 13 and 15), an interrupt program (FIG. 4), an sample control program (FIG. 19), a timer overflow program (FIG. 20) and an output calculation program (FIG. 23) are stored in respectively corresponding address blocks 244, 246, 250, 252 and 254.

The input interface also has a temporary register for temporarily holding input timing for the sensor pulses. RAM 236 similarly has a memory block holding input timing for the sensor pulses. The contents of the memory block 240 of RAM may be shifted whenever calculations of the pulse interval, wheel speed, wheel acceleration or deceleration, target wheel speed, slip rate and so forth are completed. One method of shifting the contents is known from the corresponding disclosure of the U.S. Pat. No. 4,408,290. The disclosure of the U.S. Pat. No. 4,408,290 is hereby incorporated by reference. RAM also has a memory block 242 for holding pulse intervals of the input sensor pulses. The memory block 242 is also adapted to shift the contents thereof according to the manner similar to set forth in the U.S. Pat. No. 4,408,290.

An interrupt flag 256 is provided in the controller unit 202 for signalling interrupt requests to the CPU. The interrupt flag 256 is set in response to the interrupt command from the interrupt command generator 229. A timer overflow interrupt flag 258 is adapted to set an overflow flag when the measured interval between any pair of monitored sensor pulses exceeds the a capacity of a clock counter.

In order to time the arrival of the sensor pulses, a clock is connected to the controller unit 202 to feed time signals indicative of elapsed real time. The timer signal value is latched whenever a sensor pulse is received and stored in either or both of the temporary register 231 in the input interface 230 and the memory block 240 of RAM 236.

The operation of the controller unit 202 and the function of each elements mentioned above will be described with reference to FIGS. 13 to 30.

Figure 13:
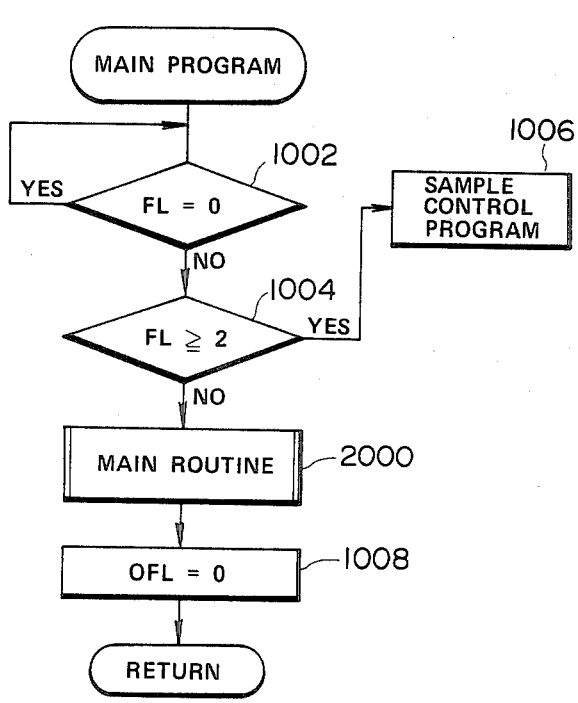
FIG. 13 is a flowchart of a main program of a microcomputer constituting the controller unit of FIG. 12.

FIG. 13 illustrates the main program for the anti-skid control system. Practically speaking, this program will generally be executed as a background job, i.e. it will have a lower priority than most other programs under the control of the same processor. Its first step 1002 is to wait until at least one sample period, covering a single sensor pulse or a group thereof, as described in more detail below, is completed as indicated when a sample flag FL has a non-zero value. In subsequent step 1004, the sample flag FL is checked for a value greater than one, which would indicate the sample period is too short. If this is the case, control passes to a sample control program labelled "1006" in FIG. 13 but shown in more detail in FIG. 19. If FL=1, then the control process is according to plan, and control passes to a main routine explained later with reference to FIG. 15. Finally, after completion of the main routine, a time overflow flag OFL is reset to signify successful completion of another sample processing cycle, and the main program ends.

Figure 14:
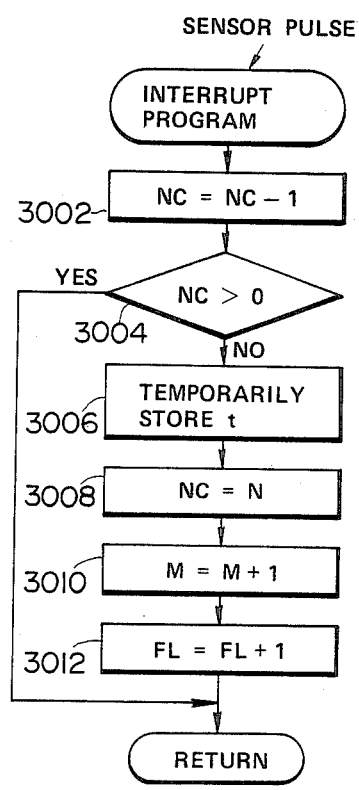
FIG. 14 is a flowchart of an interrupt program executed by the controller unit.

FIG. 14 shows the interrupt program stored in the memory block 246 of ROM 238 and executed in response to the interrupt command generated by the interrupt command generator 229 whenever a sensor pulse is received. It should be noted that a counter value NC of an auxiliary counter 233 is initially set to 1, a register N representing the frequency divider ratio is set at 1, and a counter value M of an auxiliary counter 235 is set at −1. After starting execution of the interrupt program, the counter value NC of the auxiliary counter 233 is decremented by 1 at a block 3002. The auxiliary counter value NC is then checked at a block 3004 for a value greater than zero. For the first sensor pulse, since the counter value NC is decremented by 1 (1−1=0) at the block 3002 and thus is zero, the answer of the block 3004 is NO. In this case, the clock counter value t is latched in a temporary register 231 in the input interface 230 at a block 3006. The counter value NC of the auxiliary counter 233 is therafter assigned the value N in a register 235, which register value N is representative of frequency dividing ratio determined during execution of the main routine explained later, at a block 3008. The value M of an auxiliary counter 235 is then incremented by 1. The counter value M of the auxiliary counter 235 labels each of a sequence of sample periods covering an increasing number of sensor pulses. After this, the sample flag FL is incremented by 1 at a block 3012. After the block 3012, interrupt program ends, returning control to the main program or back to block 3002, whichever comes first.

On the other hand, when the counter value NC is non-zero when checked at the block 3004, this indicates that not all of the pulses for this sample period have been received, and so the interrupt program ends immediately.

This interrupt routine thus serves to monitor the input timing t of each pulse sampling period, i.e. the time t required to receive NC pulses, and signals completion of each sample period (M=0 through M=10, for example) for the information of the main program.

Before describing the operation in the main routine, the general method of grouping the sensor pulses into sample periods will be explained to facilitate understanding of the description of the operation in the main routine.

In order to enable the controller unit 202 to accurately calculate the wheel acceleration and deceleration $a_w$, it is necessary that the difference between the pulse intervals of the single or grouped sensor pulses exceeding a given period of time, e.g. 4 ms. In order to obtain the pulse interval difference exceeding the given period of time, 4 ms, which given period of time will be hereafter referred to as "pulse interval threshold S", some sensor pulses are ignored so that the recorded input timing t of the sensor pulse groups can satisfy the following formula:

$$dT=(C-B)-(B-A)\geq S(4\text{ ms.}) \qquad (3)$$

where A, B and C are the input times of three successive sensor pulse groups.

Figure 16:
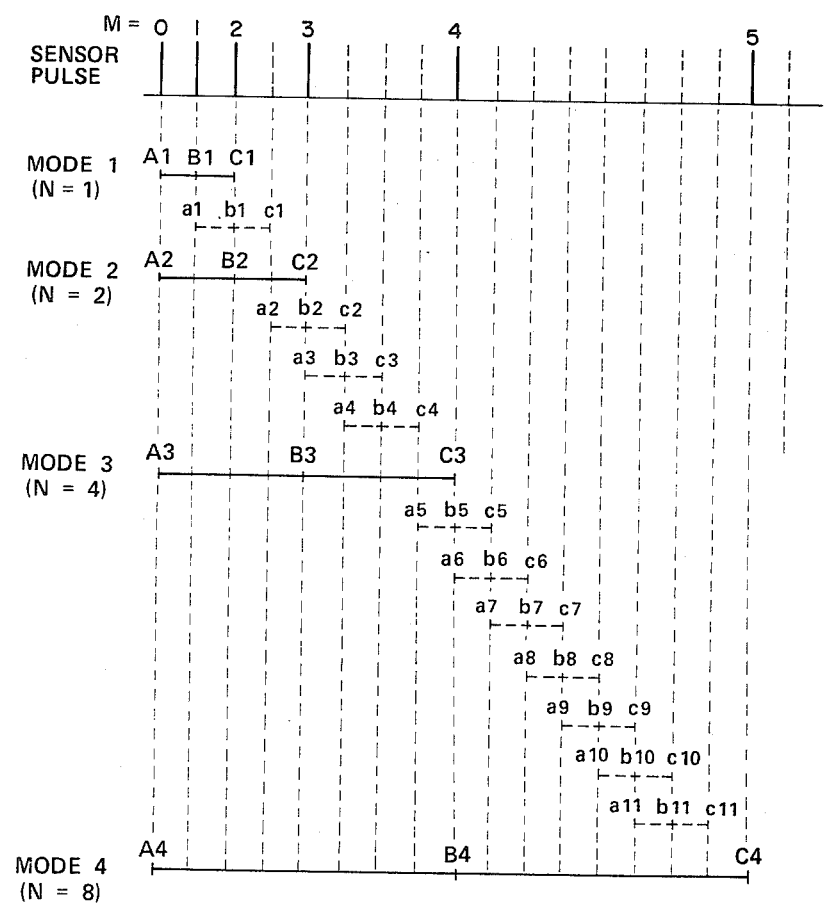
FIG. 16 is an explanatory diagram of the input timing sampling modes and variations thereof.

The controller unit 202 has different sample modes, i.e. MODE 1, MODE 2, MODE 3 and MODE 4 determining the number of sensor pulses in each sample period group. As shown in FIG. 16, in MODE 1 every sensor pulse input time is recorded and therefore the register value N is 1. In MODE 2, every other sensor pulse is ignored and the register value N is 2. In MODE 3, every fourth sensor pulse is monitored, i.e. its input time is recorded, and the register value N is 4. In MODE 4, every eighth sensor pulse is sampled and the register value N is then 8.

The controller unit 202 thus samples the input timing of three successive sensor pulses to calculate the pulse interval difference dT while operating in MODE 1. If the derived pulse interval difference is equal to or greater than the pulse interval threshold S, then sensor pulses will continue to be sampled in MODE 1. Otherwise, the input timing of every other sensor pulse is sampled in MODE 2 and from the sampled input timing of the next three sensor pulses sampled, the pulse interval difference dT is calculated to again be compared with the pulse interval threshold S. If the derived pulse interval difference is equal to or greater than the pulse interval threshold S, we remain in MODE 2. Otherwise, every four sensor pulses are sampled in MODE 3. The input timings of the next three sampled sensor pulses are processed to derive the pulse interval difference dT. The derived pulse interval difference dT is again compared with the pulse interval threshold S. If the derived pulse interval difference is equal to or greater than the pulse interval threshold S, the MODE remains at 3 and the value N is set to 4. On the other hand, if the derived pulse interval difference dT is less than the pulse interval threshold S, the mode is shifted to MODE 4 to sample the input timing of every eighth sensor pulse. In this MODE 4, the value N is set at 8.

For instance, in FIG. 16, the sensor pulses $A_1$, $B_1$ and $C_1$ are sampled under MODE 1. In MODE 2, the sensor pulses $a_1$ and $c_1$ are ignored and the sensor pulses $A_1$ $(=A_2)$, $B_2$ $(=b_1)$ and $C_2$ $(=b_2=a_3)$ are sampled. In MODE 3, the three sensor pulses $c_2$ $(=b_3=a_4)$, $c_3$ $(=b_4)$ and $c_4$ following $B_3$ $(=c_2)$ are ignored and the sensor pulses $A_3$ $(=A_1=A_2)$, $B_3$ $(=b_2=a_3)$ and $C_3$ $(=b_5=a_6)$ are sampled. In MODE 4, the seven sensor pulses $c_5$ $(=b_6=a_7)$, $c_6$ $(=b_7=a_8)$, $c_7$ $(=b_8=a_9)$, $c_8$ $(=b_9=a_{10})$, $c_9$ $(=b_{10}=a_{11})$, $c_{10}$ $(=b_{11})$ and $c_{11}$ following $B_4$ $(=c_3)$ are ignored and the sensor pulses $A_4$ $(=A_1=A_2=A_3)$, $B_4$ $(=C_3=b_5=a_6)$ and $C_4$ are sampled.

Figure 15:
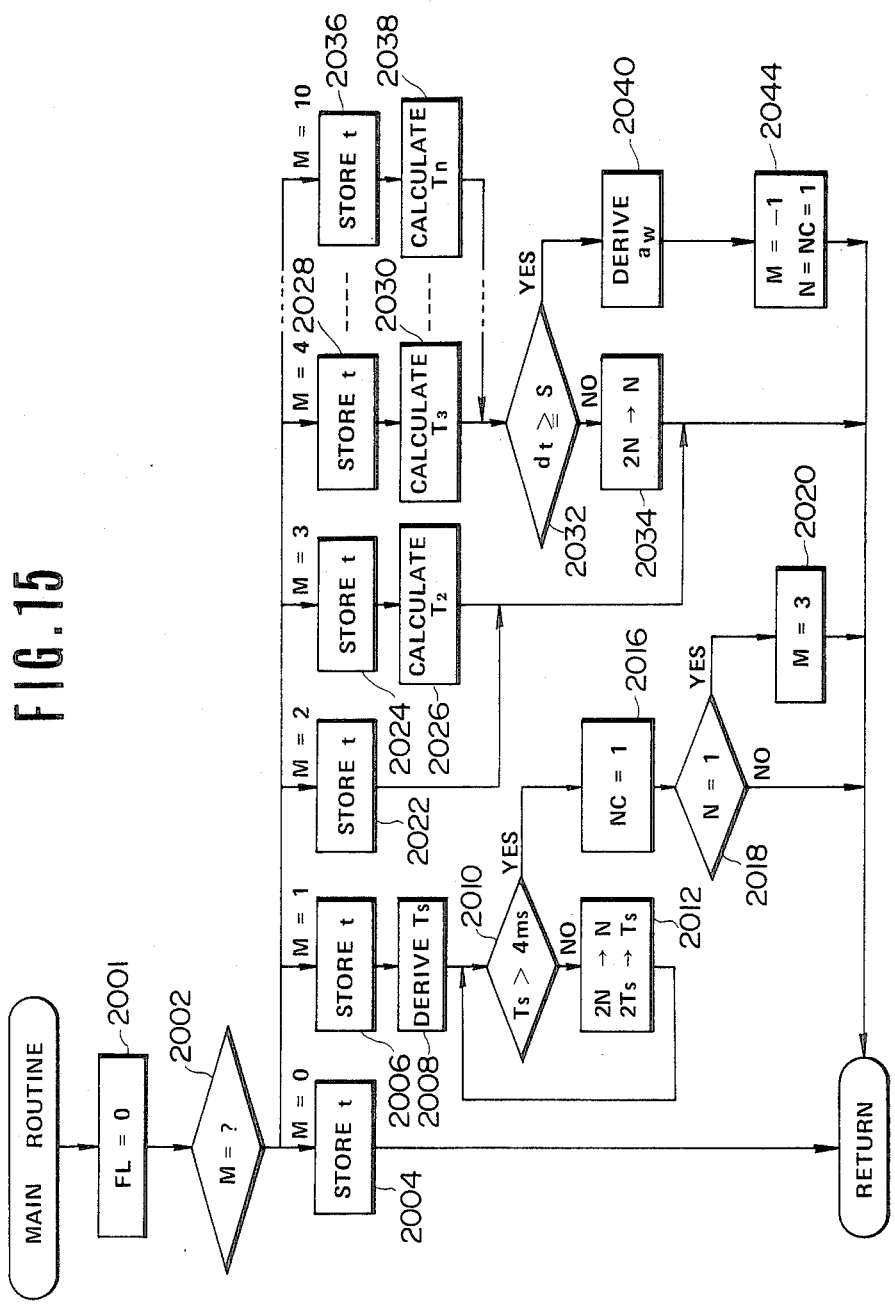
FIG. 15 is a flowchart of a main routine in the main program of FIG. 13.

Referring to FIG. 15, the main routine serves to periodically derive an updated wheel acceleration rate value $a_w$. In general, this is done by sampling larger and larger groups of pulses until the difference between the durations of the groups is large enough to yield an accurate value. In the main routine, the sample flag FL is reset to zero at a block 2001. Then the counter value M of the auxiliary counter 233, indicating the current sample period of the current $a_w$ calculation cycle, is read out at a block 2002 to dictate the subsequent program steps.

Specifically, after the first sample period (M=0), the input timing t temporarily stored in the temporary register 231 corresponding to the sensor pulse number (M=0) is read out and transferred to a memory block 240 of RAM at a block 2004, which memory block 240 will be hereafter referred to as "input timing memory". Then control passes to the block 1008 of the main program. When M=2, the corresponding input timing t is read out from the temporary register 231 and transferred to the input timing memory 240 at a block 2006. Then, at a block 2008, a pulse interval Ts between the sensor pulses of M=1 is derived from the two input timing values in the input timing memory 240. That is, the pulse interval of the sensor pulse (M=1) is derived by:

$$T_s = t_1 - t_0$$

where
$t_1$ is input time of the sensor pulse M1; and
$t_0$ is input time of the sensor pulse M0.

The derived pulse interval $T_s$ of the sensor pulse M1 is then compared with a reference value, e.g. 4 ms., at a block 2010. If the pulse interval $T_s$ is shorter than the reference value, 4 ms., control passes to a block 2012 wherein the value N and the pulse interval $T_s$ are multiplied by 2. The doubled timing value ($2T_s$) is again compared with the reference value by returning to the block 2010. The blocks 2010 and 2012 constitute a loop which is repeated until the pulse interval ($2nT_s$) exceeds the reference value. When the pulse interval ($2nT_s$) exceeds the reference value at the block 2010, a corresponding value of N (2N) is automatically selected. This N value represents the number of pulses to be treated as a single pulse with regard to timing.

After setting the value of N and thus deriving the sensor pulse group size then the auxiliary counter value NC is set to 1, at a block 2016. The register value N is then checked for a value of 1, at a block 2018. If N=1, then the auxiliary counter value M is set to 3 at a block 2020 and otherwise control returns to the main program. When the register value N equals 1, the next sensor pulse, which would normally be ignored, will instead be treated as the sensor pulse having the sample period number M=3.

In the processing path for the sample period number M=3, the corresponding input timing is read from the corresponding address of the temporary register 231 and transferred to the input timing memory 240, at a block 2024. The pulse interval $T_2$ between the sensor pulses at M=1 and M=3 is then calculated at a block 2026. The derived pulse interval $T_2$ is written in a storage section of a memory block 242 of RAM 236 for a current pulse interval data, which storage section will be hereafter referred at as "first pulse interval storage" and which memory block 242 will be hereafter referred to as "pulse interval memory". After the block 2026, control returns to the main program to await the next sensor pulse, i.e. the sensor pulse for sample period number M=4.

When the sensor pulse for M=4 is received, the value t of the temporary register 231 is read out and transferred to the input timing memory 240 at block 2028. Based on the input timing of the sensor pulses for M=3 and M=4, the pulse interval $T_3$ is calculated at a block 2030. The pulse interval $T_3$ derived at the block 2030 is then written into the first pulse interval storage of the pulse interval memory. At the same time, the pulse interval data $T_2$ previously stored in the first pulse interval storage is transferred to another storage section of the pulse interval memory adapted to store previous pulse interval data. This other storage section will be hereafter referred to as "second pulse interval storage". Subsequently, at a block 2032 the contents of the first and second storages, i.e. the pulse interval data $T_2$ and $T_3$ are read out. Based on the read out pulse interval data $T_2$ and $T_3$, a pulse interval difference dT is calculated at block 2032 and compared with the pulse interval threshold S to determine whether or not the pulse interval difference dT is large enough for accurate calculation of wheel acceleration or deceleration $a_w$. If so, process goes to the block 2040 to calculate the wheel acceleration or deceleration according to the equation (1). The register value N is then set to 1 at the block 2044 and thus MODE 1 is selected. In addition sample period number M is reset to $-1$, and the $a_w$ derivation cycle starts again. On the other hand, if at the block 2032 the pulse interval difference dT is too small to calculate the wheel acceleration or deceleration $a_w$, then the value N is multiplied by 2 at a block 2034. Due the updating of the value N, the sample mode of the sensor pulses is shifted to the next mode.

When the block 2034 is performed and thus the sample mode is shifted to MODE 2 with respect to the sensor pulse of M=4', the sensor pulse $c_2$ input following to the sensor pulse of M=4' is ignored. The sensor pulse $c_3$ following to the ignored sensor pulse $c_2$ is then taken as the sensor pulse to be sampled as M=3". At this time, the sensor pulse of M=4' is treated as the sensor pulse of M=2" and the sensor pulse of M=2 is treated as the sensor pulse of M=1". Therefore, calculation of the interval difference dT and discrimination if the derived interval difference dT is greater than the pulse interval threshold S in the block 2032 will be carried out with respect to the sensor pulse $c_3$ which will be treated as the sensor pulse of M=4". The blocks 2032 and 2034 are repeated until the interval difference greater than the pulse interval threshold S is obtained. The procedure taken in each cycle of repetition of the blocks 2032 and 2034 is substantially same as that set forth above.

As set forth above, by setting the counter value NC of the auxiliary counter 233 to 1 at the block 2016, the input timing of the sensor pulse received immediately after initially deriving the sample mode at the blocks 2010 and 2012 will be sampled as the first input timing to be used for calculation of the wheel acceleration and deceleration. This may be contrasted with the procedure taken in the known art.

Figure 18:
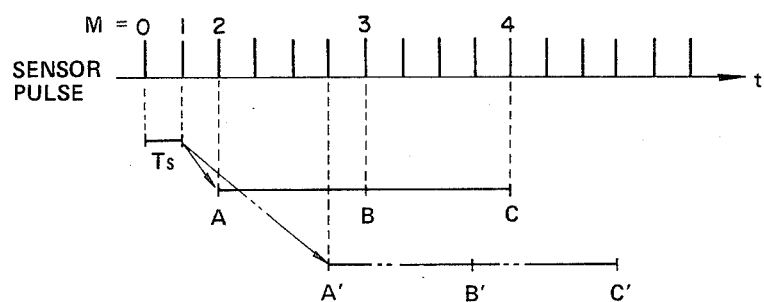
FIG. 18 is a diagram of the period of time during which sensor pulses are sampled in accordance with the present invention, which period of time is compared with that used in the typical prior art.

FIG. 18 shows timing of calculation of the wheel acceleration and deceleration in comparison with the calculation timing of the wheel acceleration and deceleration in the prior art. As will be appreciated from FIG. 18, in the prior art, after deriving the sample mode so that the pulse interval $T_s$ is longer than the reference value, e.g. 4 ms, the first sensor pulse A' is sampled after thinning the corresponding number of sensor pulses e.g. 3 sensor pulses in the shown case. On the other hand, the first sensor pulse A, according to the present invention, can be sampled with respect to the sensor pulse input immediately after deriving the sample mode. As will be appreciated herefrom, sample timing according to the present invention is faster than that in the prior art so that calculation of the wheel acceleration and deceleration can be performed at an earlier timing than that in the conventional art. In other words, the time lag of wheel acceleration/deceleration calculation due to sensor pulse grouping can be shortened.

Figure 17:
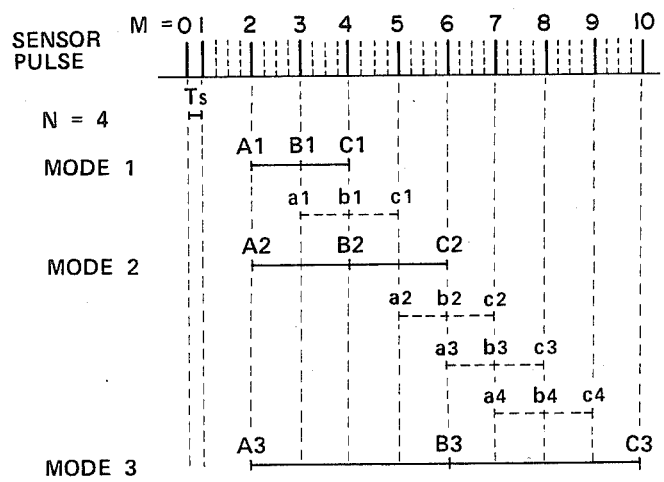
FIG. 17 is another explanatory diagram of the sampling timing of the sensor pulse input timing.

FIG. 17 shows a modified procedure can be taken for obtaining the interval difference dT larger than the pulse interval threshold S. In this modification, SUB-MODE as illustrated is used instead of performing the block 2034 to shift the sample mode of FIG. 16.

In this modification, when MODE 3 is selected during execution of the main routine of FIG. 15, at the blocks 2010, 2012 and 2016, the controller unit 202 is operating under MODE 3, first the sensor pulses $A_1$, $B_1$ and $C_1$ are sampled as shown in FIG. 17. The pulse interval difference between ($C_1-B_1$) and ($B_1-A_1$) is calculated in response to the sensor pulse $C_1$ (M=4). This operation for detecting the interval difference dT larger than the pulse interval threshold S is substantially corresponding to the operation at the blocks 2032, in the main routine of FIG. 15. If the determined pulse interval difference dT is equal to or greater than the pulse interval threshold S, the wheel acceleration or deceleration will be calculated using the derived pulse interval difference dT (SUB-MODE 1) at the block 2040 of the main routine of FIG. 15. On the other hand, if the derived pulse interval difference dT is less than the pulse interval threshold S, the sensor pulses $A_2$ (=$A_1$:M=2), $B_2$ (=$C_1$:M=4) and $C_2$ (M=6) are sampled in SUB-MODE 2. If the pulse interval difference derived from the input timing of $A_2$, $B_2$ and $C_2'$ is less than the pulse interval threshold S, then the controller unit 202 shifts the operation mode into SUB-MODE 3 in which the sensor pulses $A_3$ (=$A_1$=$A_2$:M=2), $B_3$ (=$C_2$:M=6) and $C_3$ (M=10) are sampled.

In both of SUB-MODEs 2 and 3, calculation for deriving the wheel acceleration or deceleration $a_w$ relative to the sensor pulses M5, M6, M7, M8 and M9 are performed with taking the input timing of two proceeding sensor pulses similarly to the procedure performed at SUB-MODE 1 when the interval difference dT larger than the pulse interval threshold S can be detected with respect to M7, M8 or M9, for example.

As will be appreciated herefrom, SUB-MODE referred to hereabove mean further variations of the sensor pulse sample mode in order to obtain the interval difference dT greater than the pulse interval threshold S for enabling calculation of the wheel acceleration and deceleration at the block 2040 of the main routine of FIG. 15. With the foregoing modification of FIG. 17, even when the interval difference dT greater than the pulse interval threshold S is obtained with respect to the sensor pulse which has to be thinned under the procedure of FIG. 16, the wheel acceleration and deceleration can be derived for reducing loss time. Further, according to this modified procedure, the calculation timing of the wheel acceleration and deceleration can follow relatively abrupt change of the wheel speed.

FIG. 19 shows the sample control program stored in the memory block 250 of ROM 238. This sample control program is executed when the sample flag FL reaches a predetermined value. In the embodiment shown, the sample control program is executed when the sample flag value FL equals 2. When the sample flag value FL=2 at the block 1004 in FIG. 13, then the sample control program is executed to multiply the auxiliary counter value N by 2, at a block 4002 of FIG. 19. At the same time, the auxiliary counter value NC is set to 1. Thereafter, the sample flag is reset to zero at a block 4004.

The sample control program of FIG. 19 provides a quick and simple adjustment of the sampling mode for both initial start-up and cases where the wheel accelerates so quickly that two sampling periods are completed within a single acceleration rate $a_w$ derivation cycle. Setting N equal to 2N in block 4002 doubles the sample size and so effectively doubles the sample period and setting NC to 1 ensures that the sampling will restart immediately with the next sensor pulse.

FIG. 20 shows the timer overflow program stored in the memory block 252 of ROM. As set forth above, the clock counter 259 used in the embodiment shown has the capacity to count the clock pulses from the clock generator 11 for 64 ms. Therefore, the timer overflow program is executed as an interrupt program whenever the counter value of the clock counter 259 reaches its maximum value (counter is full counted), i.e. every 64 ms. Upon starting execution of the timer overflow program, the timer overflow value OFL is incremented by 1, at a block 4010. The overflow value OFL is then checked at a block 4012. If the overflow value OFL is less than a given value, e.g. 2, then control returns to the main routine of the main program. Since the timer overflow value OFL is cleared at the end of the main program at the block 1008, if the timer overflow program is executed twice during one cycle of execution of main program, the overflow value OFL would become 2. In this case, the answer at the block 4012 would be YES and the wheel speed value $V_w$ would be set to zero and the wheel acceleration and deceleration value $a_w$ would also be set to zero.

Figure 21:
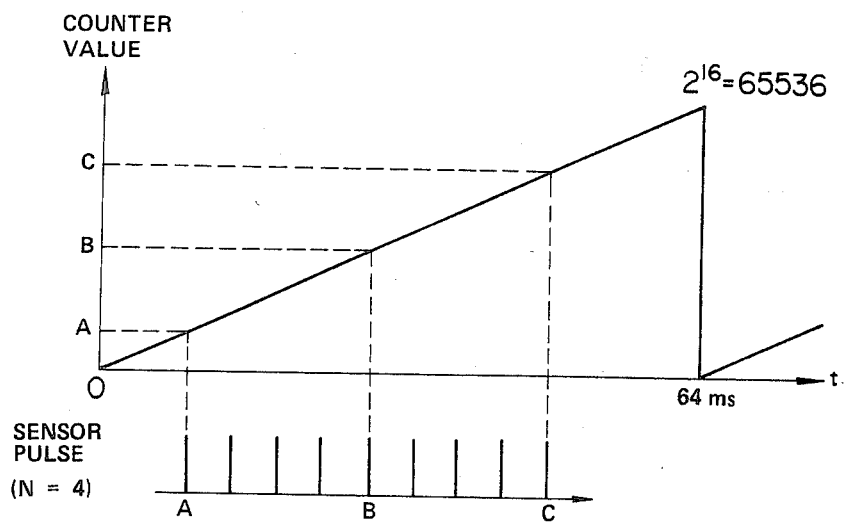
FIG. 21 is a graph of the variation of a counter value of a clock counter in the preferred embodiment of controller unit.
Figure 22:
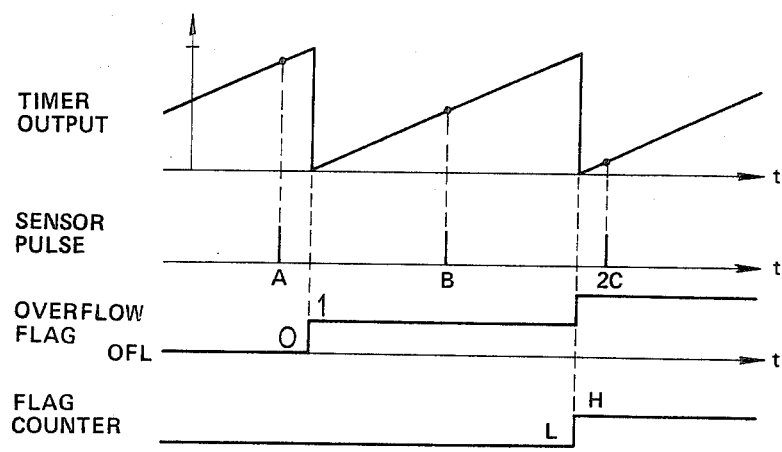
FIG. 22 is a timing chart of the timer overflow which is shown in relation to the value of the timer overflow interrupt flag.
Figure 24:
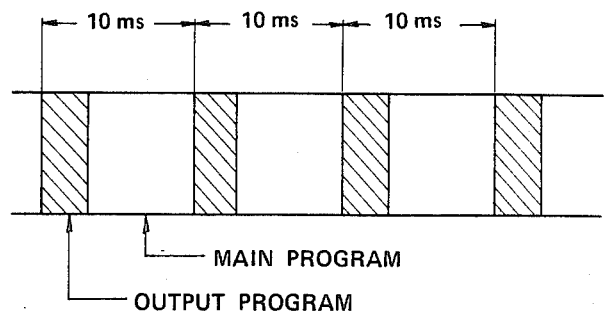
FIGS. 24 and 25 are diagrams of execution timing of the output calculation program in relation to the main program.
Figure 25:
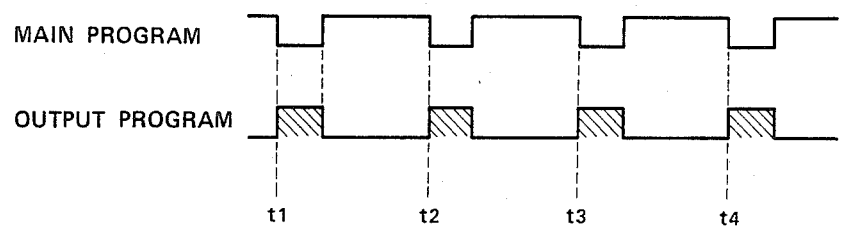

For instance, if three successive sensor pulses are produced within the period of time for which the clock counter 259 counts the clock pulses from the clock signal generator, as shown in FIG. 21, the input timing of respective sensor pulses may be as shown at A, B and C, corresponding to the counter values $C_A$, $C_B$ and $C_C$. The overflow value OFL remains at zero in response to each of the sensor pulses A, B and C, since the sensor pulses are received before the counter time elapses. Therefore, the first time the timer overflow program is executed after receiving the sensor pulse C, the timer overflow value is incremented by 1 during execution of the timer overflow program at the block 4010. In this case, the timer overflow value OFL is still only 1 which is smaller than the limit checked for at the block 4012. On the other hand, if the sensor pulses are produced at intervals relatively long so that the timer overflow program can be executed twice before three successive sensor pulses are sampled, as shown in FIG. 23, then the wheel is movely so slowly that wheel acceleration $a_w$ can not be reliably calculated.

Therefore, in the timer overflow program, as shown in FIG. 20, the wheel speed $V_w$ and the wheel acceleration or deceleration $a_w$ are set to zero at the block 4014. By setting both the wheel speed $V_w$ and the wheel acceleration and deceleration $a_w$ to zero, serious errors will be avoided.

FIG. 23 shows the output program for deriving the wheel speed $V_w$, wheel acceleration and deceleration $a_w$ and slip rate R, selecting the operational mode, i.e. application mode, hold mode and release mode and outputting an inlet signal EV and/or an outlet signal AV depending upon the selected operation mode of the actuator 16.

When the application mode is selected the inlet signal EV goes HIGH and the outlet signal EV goes HIGH. When the release mode is selected, the inlet signal EV goes LOW and the outlet signal AV also goes LOW. When the selected mode is the hold mode, the inlet signal EV remains HIGH while the outlet signal AV goes LOW. These combinations of the inlet signal EV and the outlet signal AV correspond to the actuator supply current levels shown in FIG. 11 and thus actuate the electromagnetic valve to the corresponding positions illustrated in FIGS. 4, 5 and 6.

The output program is stored in the memory block 254 and adapted to be read out periodically, e.g. every 10 ms, to be executed as an interrupt program. The output calculation program is executed in the time regions shown in hatching in FIGS. 24 and 25.

During execution of the output calculation program, the pulse interval T is read out from a memory block 241 of RAM which stores the pulse interval, at a block 5002. As set forth above, since the pulse interval T is inversely proportional to the wheel rotation speed $V_w$, the wheel speed can be derived by calculating the reciprocal (1/T) of the pulse interval T. This calculation of the wheel speed $V_w$ is performed at a block 5004 in the output program. After the block 5004, the target wheel speed $V_i$ is calculated at a block 5006. The manner of deriving the target wheel speed $V_i$ has been illustrated in the U.S. Pat. Nos. 4,392,202 to Toshiro MATSUDA, issued on July 5, 1983, 4,384,330 also to Toshiro MATSUDA, issued May 17, 1983 and 4,430,714 also to Toshiro MATSUDA, issued on Feb. 7, 1984, which are all assigned to the assignee of the present invention. The disclosure of the above-identified three United States Patents are hereby incorporated by reference for the sake of disclosure. As is obvious herefrom, the target wheel speed $V_i$ is derived as a function of wheel speed deceleration as actually detected. For instance, the wheel speed $V_w$ at which the wheel deceleration $a_w$ exceeds the deceleration threshold $a_{ref}$, e.g. $-1.2$ G is taken as one reference point for deriving the target wheel speed $V_i$. The wheel speed at which the wheel deceleration $a_w$ also exceeds the deceleration threshold $a_{ref}$, is taken as the other reference point. In addition, the period of time between the points a and b is measured. Based on the wheel speed $V_{w1}$ and $V_{w2}$ and the measured period P, the deceleration rate $dV_i$ is derived from:

$$dV_i = (V_{w1} - V_{w2})/P \qquad (4)$$

This target wheel speed $V_i$ is used for skid control in the next skid cycle.

It should be appreciated that in the first skid cycle, the target wheel speed $V_i$ cannot be obtained. Therefore, for the first skid cycle, a predetermined fixed value will be used as the target wheel speed $V_i$.

Figure 26:
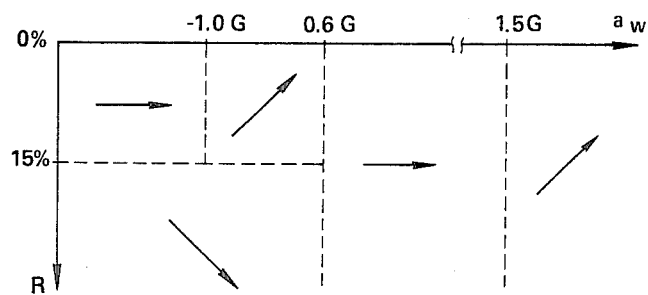
FIG. 26 is a table determining the operation mode of the actuator 16, which table is accessed in terms of the wheel acceleration and deceleration and the slip rate.

At a block 5008 in FIG. 23, the slip rate R is calculated according to the foregoing formula (2). Subsequently, the operational mode is determined on the basis of the wheel acceleration and deceleration $a_w$ and the slip rate R, at a block 5010. FIG. 26 shows a table used in determining or selecting the operational mode of the actuator 16 and which is accessed according to the wheel acceleration and deceleration $a_w$ and the slip rate R. As can be seen, when the wheel slip rate R is in the range of 0 to 15%, the hold mode is selected when the wheel acceleration and deceleration $a_w$ is lower thann $-1.0$ G and the application mode is selected when the wheel acceleration and deceleration $a_w$ is in the range of $-1.0$ G to 0.6 G. On the other hand, when the slip rate R remains above 15%, the release mode is selected when the wheel acceleration and deceleration $a_w$ is equal to or less than 0.6 G, and the hold mode is selected when the wheel acceleration and deceleration is in a range of 0.6 G to 1.5 G. When the wheel acceleration and deceleration $a_w$ is equal to or greater than 1.5 G, the application mode is selected regardless of the slip rate.

According to the operational mode selected at the block 5010, the signal levels of the inlet signal EV and the outlet signal AV are determined so that the combination of the signal levels corresponds to the selected operation mode of the actuator 16. The determined combination of the inlet signal EV and the outlet signal AV are output to the actuator 16 to control the electromagnetic valve.

It should be appreciated that, although the execution timing of the output calculation program has been specified to be about 10 ms in the foregoing disclosure, the timing is not necessarily fixed to the mentioned timing and may be selectable from the approximate range of 1 ms to 20 ms. The execution timing of the output program is fundamentaly to be determined in accordance with the response characteristics of the actuator.

Figure 27B:
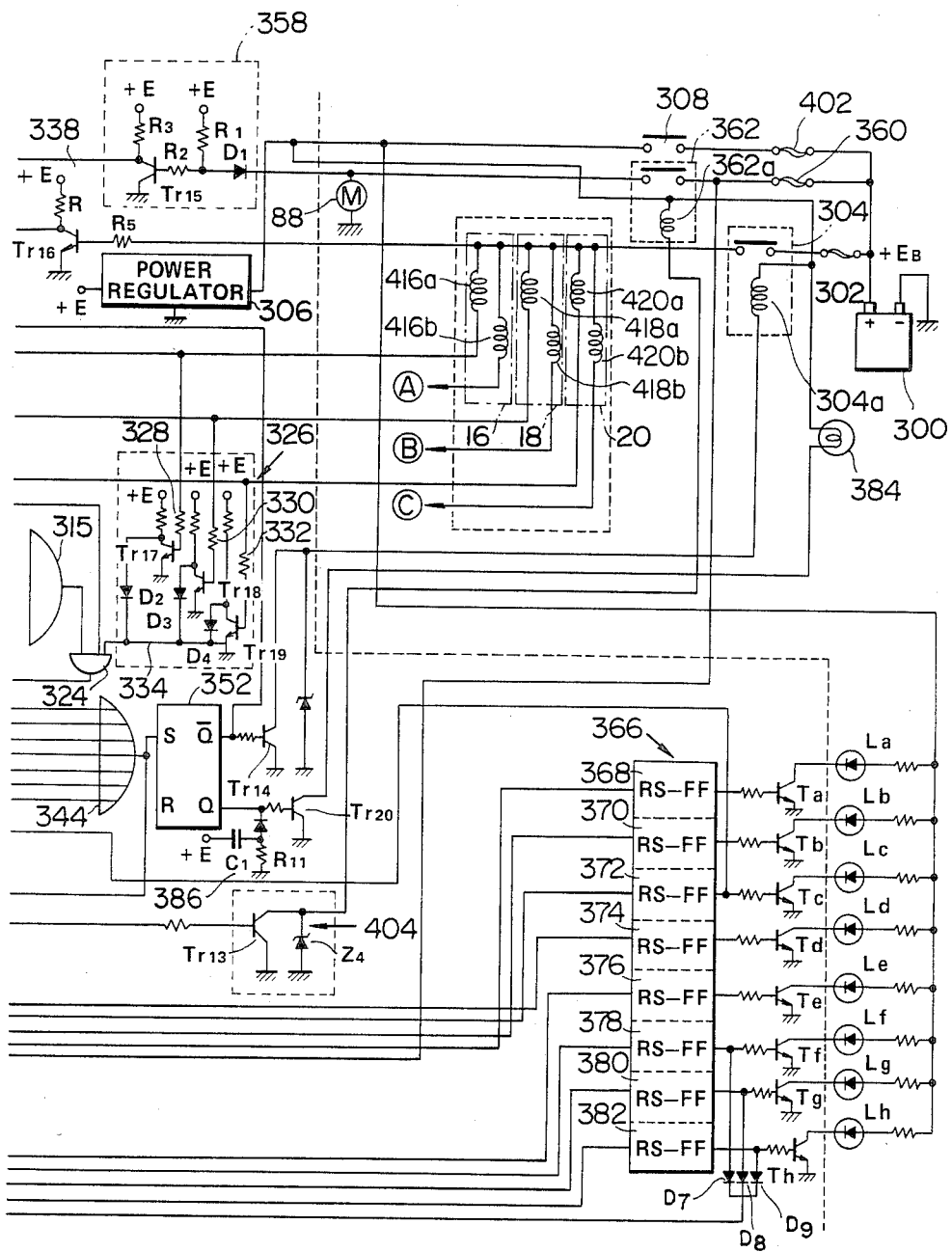
FIGS. 27A and 27B together form a circuit diagram of an overall anti-skid brake control system with the preferred embodiment of fail-safe system according to the present invention.
Figure 27A:
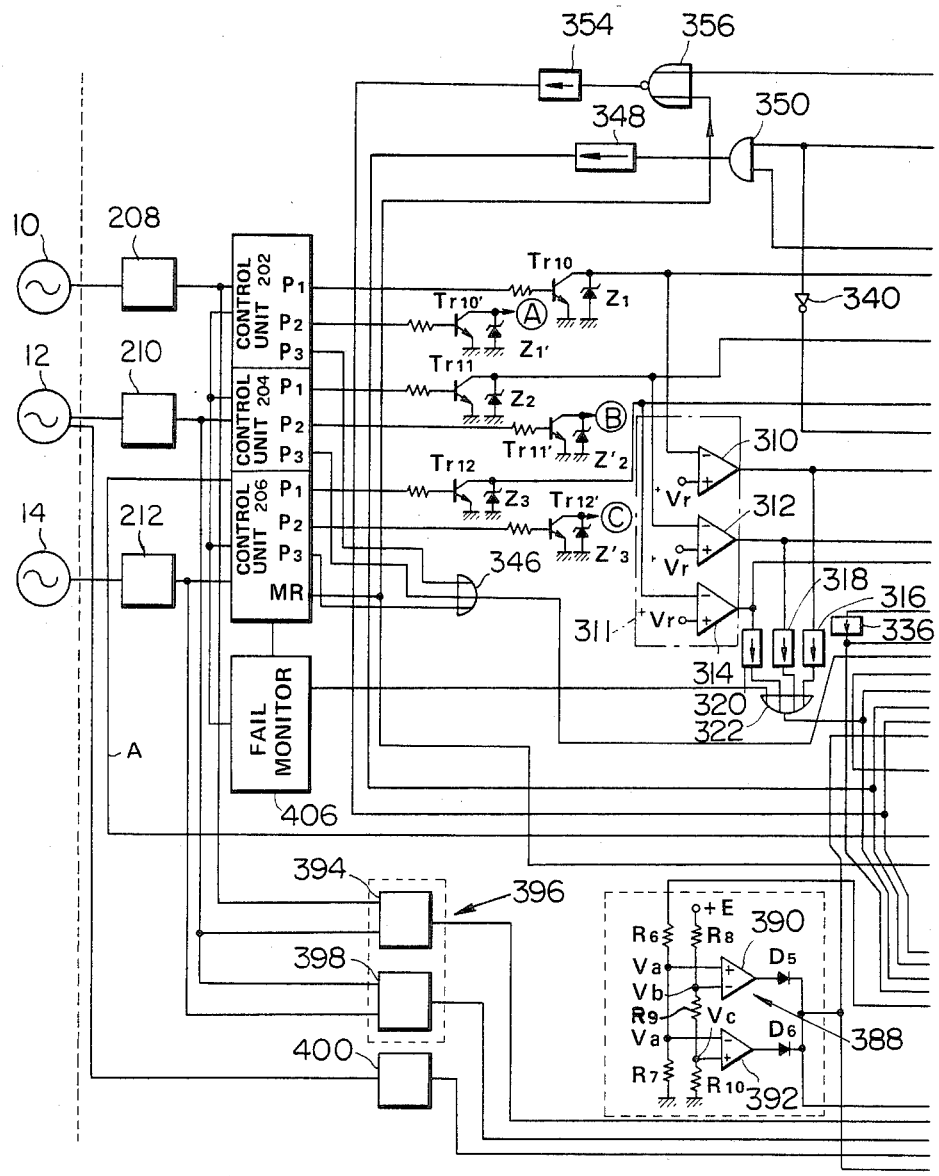

FIGS. 27A and 27B show in detail the circuitry of the preferred embodiment of anti-skid control system with a fail-safe system in accordance with the present invention. Each of the controllers 202, 204 and 206 receives a wheel speed sensor signal from speed sensors 10, 12 and 14, respectively, via respective shaping circuits 208, 210 and 212. Each controller has an output terminal $P_1$ connected to a power transistor $Tr_{10}$, $Tr_{11}$ or $Tr_{12}$ which turns ON and OFF depending upon the output level at the output terminal $P_1$. The collector electrode of each of the power transistors $Tr_{10}$, $Tr_{11}$ and $Tr_{12}$ is connected to a coil 416a, 418a and 420a in the actuator 16, 18 and 20. The coils 416a, 418a and 420a of the actuators 16, 18 and 20 are commonly connected to a vehicle battery 300 through a fuse 302 and a relay circuit 304 which performs a fail-safe operation to be explained later when the anti-skid controller malfunctions. Surge-absorbing Zener diodes $Z_1$, $Z_2$ and $Z_3$ are connected to the collector electrodes of the power transistors $Tr_{10}$, $Tr_{11}$ and $Tr_{12}$ respectively.

The battery 300 is also connected to supply battery voltage $+Eb$ to a voltage regulator 306 through an ignition switch 308. The resulting regulated voltage $+E$ is supplied to the various components of the anti-skid control system.

In the embodiment shown, the EV signals are output through the output terminals $P_1$ of the controllers 202, 204 and 206. On the other hand, the controllers 202, 204 and 206 each have a output terminal $P_2$ outputting the corresponding AV signal. The output terminals $P_2$ of the controllers 202, 204 and 206 are connected to coils 416b, 418b and 420b of the actuators 16, 18 and 20 respectively via power transistors $Tr_{10}'$, $Tr_{11}'$ and $Tr_{12}'$ associated with Zener diodes $Z_1'$, $Z_2'$ and $Z_3'$. The coils 416b, 418b and 420b are also connected in parallel to the battery 300 through the fuse 302 and the relay circuit 304.

The collector electrodes of the power transistors $Tr_{10}$, $Tr_{11}$ and $Tr_{12}$ are also connected to negative input terminals of comparators 310, 312 and 314 respectively which comprise differential amplifiers. The positive input terminals of the comparators 310, 312 and 314 are all connected to corresponding reference signal generators which monitors of the voltage at the corresponding collector electrodes of the power transistors $Tr_{10}$, $Tr_{11}$ and $Tr_{12}$ and produce HIGH-level reference signals when a HIGH-level voltage at the collector electrode of the corresponding power transistor is detected. Although not fully illustrated in FIG. 27, the transistors $Tr_{10}'$, $Tr_{11}'$ and $Tr_{12}'$ are also connected to corresponding comparators which, in turn are connected to reference signal generators operating similarly to those connected to the comparators 310, 312 and 314. These comparators form a comparator circuit 311 in conjunction with the comparators 310, 312 and 314. Each comparator 310, 312 and 314 is connected to a timer circuit 316, 318 and 320 respectively, which is triggered by a HIGH-level comparator output from the corresponding comparator 310, 312 and 314 to measure the period for which the comparator signal remains HIGH. If the measured time exceeds a predetermined limit, the timers 316, 318 and 320 output an abnormal state-indicative signal to an OR gate 322. The comparators 310, 312 and 314 are also connected for output to an AND gate 324 which also receives an input from an actuator-monitoring circuit 326. The actuator-monitoring circuit 326 comprises transistors $Tr_{17}$, $Tr_{18}$ and $Tr_{19}$, the base electrodes of which are connected to the collector electrodes of the power transistors $Tr_{10}$, $Tr_{11}$ and $Tr_{12}$, via resistors 328, 330 and 332 respectively. Collector electrodes of the transistors $Tr_{17}$, $Tr_{18}$ and $Tr_{19}$ are connected for input to the AND gate 324 via diodes $D_2$, $D_3$ and $D_4$ and a common line 334. The resistances of the resistors 328, 330 and 332 are selected to be sufficiently greater than the resistance of the coils 416a, 418a and 420a. Although the actuator-operation monitoring circuit 326 is shown in FIG. 27 to be monitoring only the lines from the output terminals $P_1$ to the coils 416a, 418a and 420a, it should be appreciated that it also monitors the lines from the output terminals $P_2$ to the coils 416b, 418b and 420b.

The output terminal of the AND gate 324 is connected to a timer 336 which is triggered by a HIGH-level output from the AND gate 324 to measure the period for which the output of the AND gate 324 remains HIGH. The timer 336 outputs a HIGH-level timer signal when the measured elapsed time reaches a predetermined time. The timer signal is sent to one of the input terminals of an OR gate 344.

It should be appreciated that the AND gate 324 serves to prevent erroneous detection of actuator malfunction, i.e. an open circuit in the coils. When the transistors $Tr_{10}$, $Tr_{10}'$, $Tr_{11}$, $Tr_{11}'$, $Tr_{12}$ and $Tr_{12}'$ turn ON in response to HIGH-level inputs to their base electrodes from the various outut terminals $P_1$ and $P_2$, the input level at the base electrodes of the transistors in the actuator-monitoring circuit 326, i.e. of transistors $Tr_{17}$, $Tr_{18}$ and $Tr_{19}$, go LOW, allowing the voltage at their collector electrodes to rise. As a result, the input level at the input terminal of the AND gate 324 from the actuator-monitoring circuit 326 goes HIGH. However, at the same time, the comparators in the comparator circuit 311, i.e. 310, 312, 314 output LOW-level comparator signals due to the HIGH-level inputs at their negative input terminals. Therefore, the AND condition of the AND gate 324 is not established, and the output level of the AND gate remains LOW.

The AND gate 324 is connected for input from a power supply monitoring circuit 338 through an inverter 340. In power supply monitoring circuit 338 a transistor $Tr_{16}$ is conductive unless there is an open circuit in a relay coil 304a in the relay circuit 304, failure of a transistor $Tr_{14}$ or blowing of fuse 302, in other words, as long as the power supply is intact. If the power supply fails due to one of these conditions, the voltage at the collector of transistor $Tr_{16}$ goes HIGH, so that the input to AND gate 324 via inverter 340 goes LOW, preventing a HIGH-level output. Therefore, if the power supply to the coils of the actuators 16, 18 and 20 should fail, the AND gate 324 would not erroneously signal an actuator hardware failure.

The timer 336 and the OR gate 322 are both connected for output to an OR gate 344. Another of the input terminals of the OR gate 344 is connected via another OR gate 346 to the output terminals $P_3$ of the controllers 202, 204 and 206. The output terminals $P_3$ output fault-indicative signals when malfunction of the controller or the sensors is detected. The OR gate 344 also receives an input from a timer 348 which, in turn, receives input from the collector electrode of the tansistor $Tr_{16}$ of the power supply monitoring circuit 338 via an AND gate 350. The other input terminal of the AND gate 350 is connected to the inverted output terminal $\overline{Q}$ of a flip-flop 352 described later. The OR gate 344 also receives input from another timer 354 which is, in turn, receives input via a NOR gate 356 from the positive-biased collector of a transistor $Tr_{15}$ in a motor-monitoring circuit 358. The motor-monitoring circuit 358 comprises the transistor $Tr_{15}$, a diode $D_1$ and resistors $R_1$ to $R_3$. The base electrode of the transistor $Tr_{15}$ is connected to the motor 88 of the fluid pump 90 via the diode $D_1$ and resistor $R_2$. The motor 88 is, in turn, connected to the battery 300 via a fuse 360 and a relay circuit 362.

The OR gate 344 receives one other input from a faulty condition memory 366 consisting of SET/RESET flip-flops (RS-FF's) 368, 370, 372, 374, 376, 378, 380 and 382. In the embodiment shown, the last input terminal of the OR gate 344 is connected in common to the RS-FF's 378, 380 and 382 via diodes $D_7$, $D_8$ and $D_9$.

The output terminal of the OR gate 344 is connected to a disable terminal of the controllers 202, 204, 206 and a set input terminal (S) of the flip-flop 352. The output terminal of the OR gate 344 is also connected to the input terminal. Under normal conditions, the flip-flop 352 remains in its reset state, in which the output at its inverted output terminal $\overline{Q}$ turns ON a transistor $Tr_{14}$ which in turn energizes the relay coil 304a of the relay circuit 304. The inverted output terminal $\overline{Q}$ of the flip-flop 352 is also connected to one of the input terminals of the AND gate 350 to supply a HIGH-level input enabling the AND gate 350 to monitor the power supply. On the other hand, the positive output terminal Q of the flip-flop 352 is connected to illuminate a fault monitor lamp 384 via a transistor $Tr_{20}$. The base electrode of the transistor $Tr_{20}$ is connected to a differentiation circuit 386 comprising a capacitor $C_1$ and a resistor $R_{11}$ connected in parallel to output terminal Q. This differentiation circuit 386 is temporarily activated by the regulated power source $+E$ when the power supply is first started to temporarily turn ON the transistor $Tr_{20}$ and so illuminate the fault monitor lamp 384.

The RS-FF 368 of the fault memory 366 is connected for input from the timer 336. The RS-FF 370 is connected for input from the OR gate 322. The RS-FF 372 is connected for input from the timer 348. The RS-FF 374 is connected for input from the timer 354. The RS-FF 376 is connected for input from a battery voltage monitoring circuit 388. The battery voltage monitoring circuit 388 includes differential amplifiers 390 and 392. The non-inverting and inverting input terminals of the differential amplifiers 390 and 392 respectively are connected to receive a voltage which is derived from the battery voltage $+E_b$ by the voltage-dividing resistors $R_6$ and $R_7$. The inverting terminal of the differential amplifier 390 receives a reference voltage $V_b$ which is obtained by dividing the regulated voltage by resistors $R_8$ and $R_9$. Similarly, a reference voltage Vc obtained by dividing the regulated voltage E, specifically from the tap between serial-connected resistors $R_8$ and $R_9$ and resistor $R_{10}$, is applied to the non-inverting input terminal of the differential amplifier 392. This pair of differential amplifiers checks for abnormally high or low battery voltages. THe RS-FF 378 of the fault memory 366 is connected to a wheel speed comparator 394 in a wheel speed sensor monitoring circuit 396. The RS-FF 380 is connected to another wheel speed comparator 398 of the wheel speed sensor monitoring circuit 396. The RS-FF 382 is connected to a circuit breaking detector 400, the function of which will be explained in detail later.

Each of the RS-FF's 368, 370, 372, 374, 376, 378, 380 and 382 is connected to an indicator $L_a$, $L_b$, $L_c$, $L_d$, $L_e$, $L_f$, $L_g$ and $L_h$ via a switching transistor $T_a$, $T_b$, $T_c$, $T_d$, $T_e$, $T_f$, $T_g$ and $T_h$. The indicators $L_a$, $L_b$, $L_c$, $L_d$, $L_e$, $L_f$, $L_g$ and $L_h$ are connected to the battery 300 via the fuse 402 and the ignition switch 308.

The controller 206 has an output terminal MR which is connected to a fluid motor driver circuit 404 including a transistor $Tr_{13}$ and a Zenor diode $Z_4$.

The operation of the preferred embodiment of the fail-safe system for the anti-skid brake control system according to the present invention will be described herebelow in terms of the operation of each of the fault-monitor circuits set forth above.

MOTOR-OPERATION MONITORING CIRCUIT 358

The motor-operation monitoring circuit 358 normally supplies very little current to the motor due to diode $D_1$ and a only a low-level voltage via resistors $R_1$ and $R_2$ to the base of transistor $Tr_{15}$. Thus, in the normal state, the supplied current is too small to drive the motor 90 but the remaining voltage is insufficient to render the transistor $Tr_{15}$ conductive. However, if the motor circuit should be damaged or broken, the regulator voltage +E will be applied to the base electrode of the transistor $Tr_{15}$ via the resistors $R_1$ and $R_2$. As a result, the collector electrode of the transistor $Tr_{15}$ will be grounded, causing a LOW-level input to the NOR gate 356. The other input terminal of the NOR gate 356 is connected to the output terminal MR of the controller 206 through which the motor driver signal is output to the motor relay 362.

The LOW-level signal from the transistor $Tr_{15}$ in the absence of the motor driver signal from terminal MR causes the NOR gate 356 to output a HIGH-level signal. On the other hand, when the motor driver signal is output by the output terminal MR of the controller 206, the input level of the NOR gate terminal connected to the output terminal MR goes HIGH. At the same time, due to energization of the relay coil 362a of the motor relay 362, the motor 88 is driven by power supply through the motor relay 362 from the battery 300. Due to the supply of battery power to the motor, the diode $D_1$ is biased to block electrical communication from the regulator 306 to the motor 88. As a result, the input level at the base electrode of the transistor $Tr_{15}$ goes HIGH to render it conductive. Thus, the transistor $Tr_{15}$ sends a HIGH-level signal to the NOR gate 356. In this case, since both of the inputs to the NOR gate 356 are HIGH, the output of the NOR gate 356 remains LOW.

As will be appreciated herefrom, the NOR gate 356 outputs a HIGH-level signal only when the transistor $Tr_{15}$ is conductive and the motor driver signal is not output.

The output terminal of the NOR gate 356 is connected to the timer 354. The timer 354 is triggered by a HIGH-level output from the NOR gate to start measuring the time for which the NOR gate output remains HIGH. If the NOR gate output goes LOW before a predetermined period of time expires, the timer is reset. On the other hand, if the measured elapsed time reaches the given period of time, the timer 354 outputs a HIGH-level timer signal indicative of motor failure. The faulty motor-indicative timer signal is input to the OR gate 344, causing the OR gate to output a HIGH-level signal. The HIGH-level output from the OR gate 344 sets the flip-flop 352 which in turn turns the monitor lamp 384 on due to a ground connector via the transistor $Tr_{20}$ which is turned ON by the HIGH-level flip-flop output. On the other hand, the transistor $Tr_{14}$ is turned OFF to deenergize the relay coil 304a of the relay circuit 304. As a result, battery 300 is disconnected from the actuators coils 416a, 416b, 418a, 418b, 420a and 420b.

At the same time, the faulty motor-indicative timer signal from the timer 354 is input to the RS-FF 374 to set the latter. This also activates the transistor $T_d$ so as to illuminate the indicator $L_d$.

It should be appreciated that the timer 354 serves to enforce a delay time before response to the HIGH-level output from the NOR gate. This is believed to effectively prevent erroneous detection of motor failure which may otherwise occur due to normal delays in the response of the motor to onset and termination of its operation after changes in the level of the output from the output terminal MR.

POWER SUPPLY MONITORING CIRCUIT 338

In the normal state wherein the flip-flop 352 is reset so as to activate the transistor $Tr_{14}$ and accordingly the relay coil 304a of the relay circuit 304. Under these conditions, HIGH-level battery voltage is applied to the base electrode of the transistor $Tr_{16}$ in the power supply monitoring circuit 338. The transistor $Tr_{16}$ is thus turned ON to apply a LOW-level input to one of the input terminals of the AND gate 350. The other input terminal of the AND gate 350 receives the inverted output $\overline{Q}$ of the flip-flop 352. In the normal state, the flip-flop 352 is reset so that a HIGH-level signal is output through the inverted output terminal. Therefore, under normal conditions, the input level at the other input terminal of the AND gate is held HIGH.

If the battery power supply is blocked by a blown fuse 302, failure of relay circuit 304 or a short circuit in one of the actuator coils 416a, 416b, 418a, 418b, 420a or 420b, the transistor $Tr_{16}$ turns OFF, allowing a HIGH-level voltage to accumulate at its collector electrode. As long as the flip-flop 352 is reset, the input level at the other input terminal of the AND gate 350 is HIGH, as set forth above. Therefore, when the collector voltage of the transistor $Tr_{16}$ goes HIGH, so does the output of the AND gate 350. The timer 348 is triggered by the HIGH-level output of the AND gate to start measuring the time for which the output of the AND gate remains HIGH. If a given period of time expires before the AND gate output goes LOW, the timer outputs a HIGH-level faulty power supply-indicative timer signal to the OR gate 344. This causes the output level of the OR gate 344 to go HIGH and set the flip-flop 352. As a result, the monitor lamp 384 is turned ON and the relay coil 304a pf the relay circuit 304 is deenergized.

At the same time, the HIGH-level faulty power supply-indicative timer signal from the timer 348 is sent to the RS-FF 372. The RS-FF 372 is set by the HIGH-level faulty power supply-indicative timer signal to turn the transistor $T_c$ ON and thereby turns the indicator $L_c$ ON.

If the relay coil 304a is denergized to prevent power supply to the actuator coils for some other reason during fail-safe operation, the input to the AND gate from the inverted output terminal of the flip-flop 352 goes LOW. Therefore, in this case, even though the transistor $Tr_{16}$ is turned OFF due to interruption of the power supply via the relay circuit 304, erroneous detection by the power supply monitoring circuit 338 is satisfactorily and successfully prevented.

On the other hand, the timer 348 prevents the power supply monitoring circuit from erroneously indicating failure of the power supply when the ignition switch 308 to first closed. The time limit of the timer 348 must be longer than the greatest possible response lag of the relay circuit 304 to closure of the ignition switch 308.

COMPARATOR CIRCUIT 311

The comparator circuit 311 serves to monitor the outputs of the controllers 202, 204 and 206 and of the transistors $Tr_{10}$, $Tr_{10}'$, $Tr_{11}$, $Tr_{11}'$, $Tr_{12}$ and $Tr_{12}'$. The transistors $Tr_{10}$ to $Tr_{12}'$ are rendered conductive in response to HIGH-level outputs fron the corresponding output terminals of the controllers 202, 204 and 206. The collector of each of the transistors is connected to the inverting input terminal of the corresponding differential amplifier 310, 310', 312, 312', 314 or 314'. On the other hand, the non-inverting input terminals of the differential amplifiers receive a corresponding reference signal which goes HIGH in response to LOW-level input to the base of the corresponding transistor. Therefore, the output of a differential amplifier goes HIGH only when the corresponding transistor is turned OFF but the voltage level at its collector remains low due to some malfunction. Each of the timers 316, 316', 318, 318', 320 and 320' is responsive to a HIGH-level output from the corresponding differential amplifier to start measuring the time for which the output level of the corresponding differential amplifier remains HIGH. When the measured elapsed time reaches a given period of time, the timer produces a HIGH-level faulty control signal-indicative timer signal. The faulty control signal-indicative timer signal sets the flip-flop 352 via OR gates 322 and 344 to deenergize the relay coil 304a and so terminate power supply to the actuator coils 316a, 316b, 318a, 318b, 320a and 320b. At the same time, the set output of the flip-flop 352 lights up the monitor lamp 384.

As set forth above, the transistors $Tr_{10}$ to $Tr_{12}'$ are rendered conductive by HIGH-level outputs from the corresponding output terminals $P_1$ and $P_2$ of the controllers 202, 204 and 206 to energize the corresponding actuator coils 416a, 416b, 418a, 418b, 420a and 420b. On the other hand, as mentioned above, when the EV signal output through the $P_1$ output terminal and the AV signal output through the $P_2$ output terminal are both HIGH, the system operates in the RELEASE mode. When a HIGH-level EV signal is output through the $P_1$ output terminal and a LOW-level AV signal is output through the $P_2$ output terminal, the system operates in the HOLD mode. Therefore, the output states of each pair of transistors $Tr_{10}$ to $Tr_{12}'$ reflects the operating mode, i.e. RELEASE and HOLD modes, of the corresponding brake circuit.

A fail-monitor 406 monitors operation of the controllers 202, 204 and 206. The fail-monitor 406 is connected to the controllers 202, 204 and 206 to receive a program run signal which is output at regular intervals as long as the controller is operating normally. If the interval between successive program run signals exceeds a preset period of time, the fail-monitor 406 outputs a reset signal to the controller 202, 204 and 206 to re-initialize the controllers and restart all control operations. Thereafter, if the interval between successive program run signals again exceeds the preset period of time, the fail-monitor 406 outputs an abnormal state-indicative signal to the OR gate 322.

The fail-monitor 406 may be the watch-dog timer disclosed in U.S. Pat. No. 4,363,092 to ABO et al. The contents of the above-identified U.S. Patent are hereby incorporated by reference.

ACTUATOR-MONITORING CIRCUIT 326

The transistors $Tr_{17}$, $Tr_{17}'$, $Tr_{18}$, $Tr_{18}'$, $Tr_{19}$ and $Tr_{19}'$ are adapted to be turned OFF by HIGH voltage levels at the bases of the corresponding transistors $Tr_{10}$, $Tr_{10}'$, $Tr_{11}$, $Tr_{11}'$, $Tr_{12}$ and $Tr_{12}'$. If any one of the transistors $Tr_{17}$ through $Tr_{19}'$ is nonconductive, the combined output of the actuator-monitoring circuit 326 goes HIGH. The output of the actuator-monitoring circuit 326 is sent to the AND gate 324, another input terminal of which is connected to the collector electrode of the transistor $Tr_{16}$ of the power supply-monitoring circuit 338 via the inverter 340. The other input terminals of the AND gate are connected to the differential amplifiers 310 through 314' via an OR gate 315.

When the transistor $Tr_{10}$ is turned ON by a HIGH-level output from the controller 202, the input level at the base electrode of the transistor $Tr_{17}$ goes LOW. As a result, a HIGH-level voltage develops at the collector electrode of the transistor $Tr_{17}$, i.e. at the output of the actuator-monitoring circuit 326. In this case, since the voltage at the collector of the transistor $Tr_{10}$ remains LOW, the output level of the differential amplifier 310 also remains LOW. Therefore, in this case, the AND gate 324 outputs a LOW-level signal due to the LOW-level input from the differential amplifier 310 via the OR gate 315 despite the fact that, since the power supply is connected to the actuator coils 416a, 416b, 418a, 418b, 420a and 420b to activate the transistor $Tr_{16}$ the input to the AND gate 324 from the invertor 340 remains HIGH.

However, if an actuator coil 416a is damaged and thus the circuit connecting the battery to the transistor $Tr_{10}$ is open, the input level at the base electrode of the transistor $Tr_{17}$ remains LOW even when the transistor $Tr_{10}$ is turned OFF by a LOW-level output from the controller 202. As a result, a HIGH-level signal is input to the AND gate 324 from the transistor $Tr_{17}$ via the diode $D_2$. In this case, since the transistor $Tr_{10}$ is turned OFF, the voltage level at the collector electrode of the transistor $Tr_{10}$ goes HIGH to provide a HIGH-level input to the AND gate 324 via the OR gate 315. Since the input through the inverter 340 remains HIGH as long as the power supply continues, the "AND" conditions of the AND gate 324 are satisfied. Thus, the AND gate 324 outputs a HIGH-level gate signal to the timer 336. The timer 336 is triggered by the HIGH-level gate signal to start measuring the time for which the gate signal remains HIGH. The timer 336 outputs a HIGH-level faulty actuator-indicative timer signal if the measured time exceeds a predetermined period of time. As a result, the output level of the OR gate 344 goes HIGH to set the flip-flop 352. As a result, the monitor lamp 384 is turned ON and the relay coil 304a of the relay circuit 304 is deenergized.

At the same time, the faulty actuator-indicative timer signal of the timer 336 is also applied to the RS-FF 368 to set the latter. As a result, the transistor $T_a$ is turned ON to turn ON the indicator $L_a$.

In a similar manner, the operation of all of the actuator coils 416b, 418a, 418b, 420a and 420b is monitored.

It should be appreciated that when the power supply to the actuator coils is interrupted, the input from the actuator-operation monitoring circuit 326 goes HIGH even if the transistors $Tr_{10}$ to $Tr_{12}'$ are conductive. However, at the same time, the transistor $Tr_{16}$ remains nonconductive, resulting in a HIGH-level voltage at its collector electrode. Therefore, input to the AND gate 324 via the invertor 340 goes LOW. Therefore, if the transistors of the actuator-operation monitoring circuit 326 are deactivated due to failure of the power supply, the faulty actuator-indicative signal will not be produced.

BATTERY VOLTAGE MONITORING CIRCUIT 388

The non-inverting input terminal of the differential amplifier 390 of the battery voltage monitoring circuit 388 is connected for input from the battery 300 via the fuse 360 and via the resistor $R_6$. The inverting input terminal of the differential amplifier 392 is also connected to the battery 300 via the fuse 360 and the resistor $R_6$. The reference voltage $V_b$ applied to the inverting input terminal of the differential amplifier 390 has a voltage representing an upper battery voltage limit. The reference voltage $V_c$ applied to the non-inverting input terminal of the differential amplifier 392 represents a lower battery voltage limit. If the battery voltage becomes abnormally high, the output of the differential amplifier 390 goes HIGH. On the other hand, if the battery voltage drops below the lower limit, the output of the differential amplifier 392 goes HIGH. A HIGH-level output from either of the differential amplifiers 390 and 392 will be referred to as an abnormal battery voltage-indicative signal.

The abnormal battery voltage-indicative signal will be transmitted by the OR gate 344 to set the flip-flop 352. As a result, the monitor lamp 384 turns ON and the relay coil 304a of the relay circuit 304 is deenergized. At the same time, the abnormal battery voltage indicative signal is sent to RS-FF 376 to set the latter. As a result, the transistor $T_f$ turns ON and the indicator $L_f$ turns ON.

WHEEL SPEED SENSOR MONITORING CIRCUIT 396

The comparator 394 receives wheel speed-indicative signals from the controllers 202 and 204. The comparator 398 receives the wheel speed indicative signals from the controllers 204 and 206. The circuit breaking detector 400 is connected to the wheel speed sensor 12. The outputs of the comparators 394 and 398 and the circuit breaking detector 400 identify faulty wheel speed sensors according to the following table:

TABLE

| Faulty Sensor | 394 Output | 398 Output | 400 Output |
|---|---|---|---|
| Normal | LOW | LOW | LOW |
| 10 | HIGH | LOW | LOW |
| 12 | HIGH | HIGH | HIGH |
| 14 | LOW | HIGH | LOW |
| 10 & 12 | LOW | HIGH | HIGH |
| 12 & 14 | HIGH | LOW | HIGH |
| 10 & 14 | HIGH | HIGH | LOW |
| ALL | LOW | LOW | LOW |

The comparators 394 and 398 and the circuit breaking detector 400 are respectively connected to the RS-FF's 378, 380 and 382. The indicators $L_f$, $L_g$ and $L_h$ turn ON and OFF according to the combinations listed above. At the same time, the output of the RS-FF's 378, 380 and 382 are fed to the OR gate 344 via the diodes $D_7$, $D_8$ and $D_9$ which are connected to form a kind of OR gate. When failure of any of the wheel speed sensors is signalled by a HIGH-level output from any of the comparators 394 and 398 or the circuit breaking detector 400, the output level of the OR gate 344 goes HIGH to set the flip-flop 344, turn ON the monitor lamp 384 and deenergize the relay coil 304a of the relay circuit 304.

Figure 28:
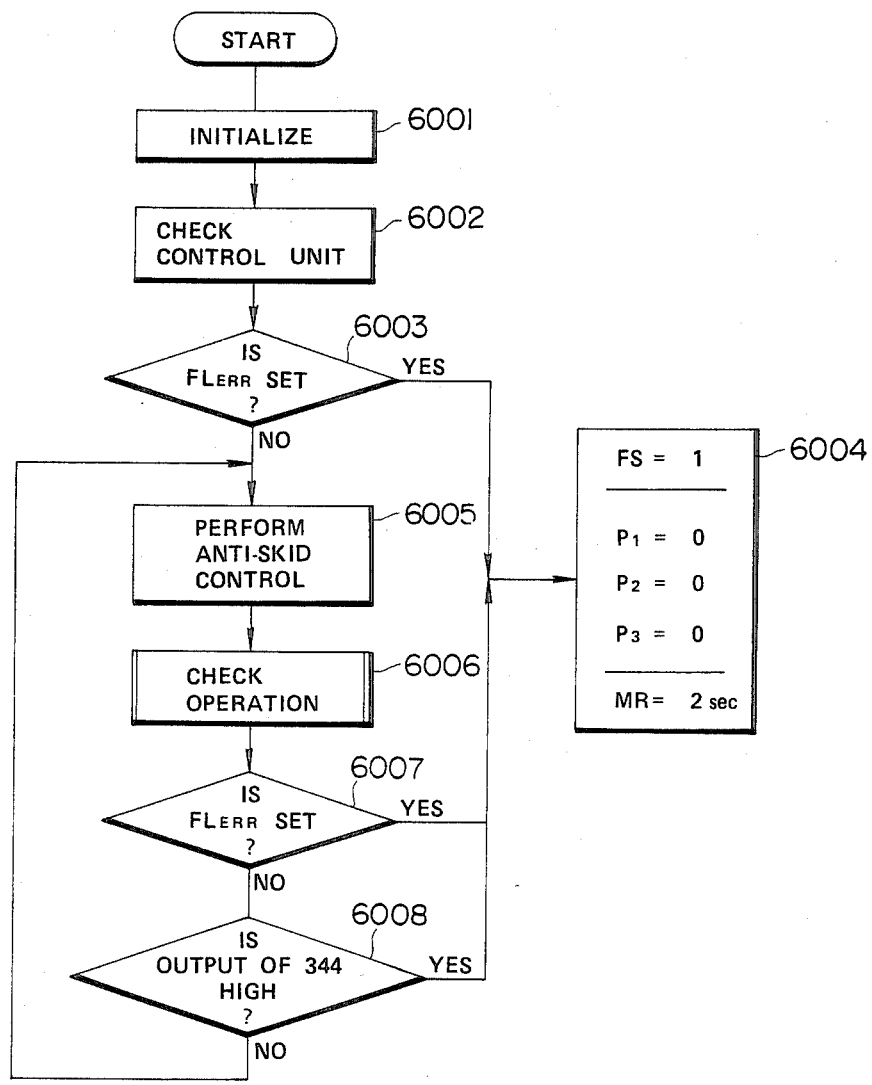
FIG. 28 is a flowchart of a program to be executed as a background job.

FIG. 28 is a flowchart of a background job executed by the controllers 202, 204 and 206. This program will be continuously executed throughout the period during which the engine is running and power is supplied to the system. Upon the onset of power supply, the controller is initialized at a block 6001. After this, a self-monitoring program is executed to check each component in the controller 202, 204 or 206, at a block 6002. In the execution of the self-monitoring programs, an error-indicative flag $FL_{ERR}$ is set when the malfunction of a certain component of the controller is detected. Also, at the same time, the wheel speed sensor is checked in accordance with the procedure disclosed in the co-pending U.S. patent application Ser. No. 601,295, U.S. Pat. No. 4,656,588. The procedure for checking the wheel speed sensor disclosed in the above-identified co-pending patent application is again incorporated by reference. When some malfunction of the wheel speed sensor is detected, the error indicative flag $FL_{ERR}$ would also be set at the same time as the disabling flag $FL_{DIS}$. The error-indicative flag $FL_{ERR}$ is checked at a block 6003. If the error-indicative flag $FL_{ERR}$ is set when checked at the block 6003, the routine goes to a block 6004 wherein the outputs of each of the output terminals $P_1$, $P_2$ and $P_3$ are set to zero. As a result, as described above, the pressure control valve is actuated to the APPLICATION mode position allowing manual control of the build-up and release of braking pressure solely depending upon the depression force applied to the brake pedal.

In the fail-safe operation performed in the block 6004, a HIGH-level output from terminal MR is maintained for a given period of time, e.g. 2 sec. This serves to drive the working fluid accumulated in the accumulators 70 and 56 in the braking circuit back to a master cylinder (not shown).

If the error-indicative flag $FL_{ERR}$ is not set as checked at the block 6003, then anti-skid brake control according to the control programs set out with reference to FIGS. 13 to 15, 19, 20 and 23 is carried out at a block 6005. The control signals derived according to these anti-skid control programs are thus send to each of the actuator coils. After outputting the control signals, the operation of each component of the system is checked at a block 6006. If a malfunction of any component is detected in the block 6006, the error-indicative flag $FL_{ERR}$ is set. After the block 6006, the error-indicative flag $FL_{ERR}$ is again checked at a block 6007. If the error indicative flag $FL_{ERR}$ is set at the block 6007, then the routine goes to the block 6004 to perform the fail-safe operation.

On the other hand, if the error-indicative flag $FL_{ERR}$ is not set when checked at the block 6007, then the output level of the OR gate 344 is checked at a block 6008. If the output level of the OR gate is HIGH, then fail-safe operation is performed in the block 6004. Otherwise, control returns to the block 6005 to carry out anti-skid control.

Figure 29:
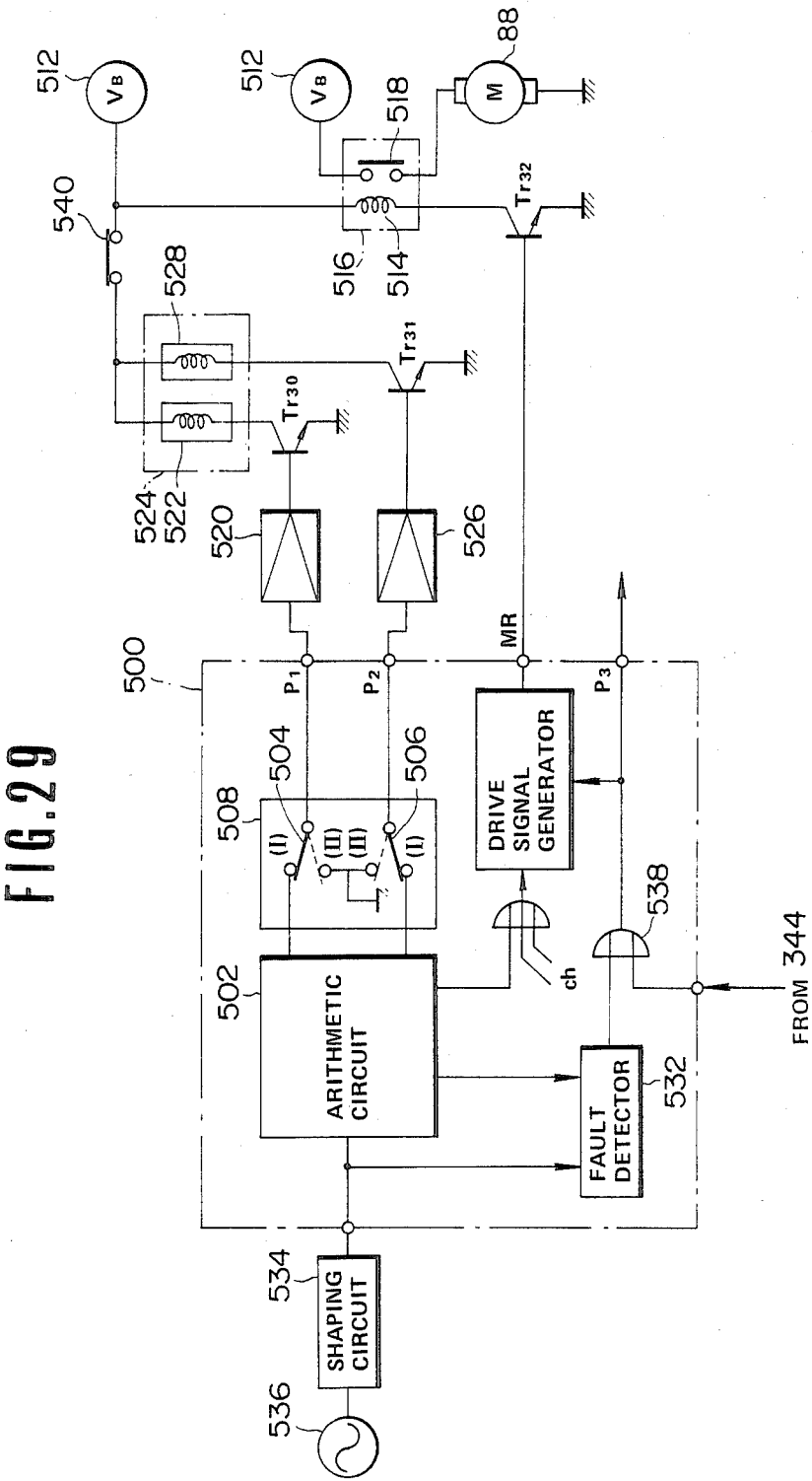
FIG. 29 is a schematic block diagram of another embodiment of anti-skid brake control system with a fail-safe system according to the present invention.

FIG. 29 shows another embodiment of the controller in the anti-skid brake control system according to the present invention. Although only a single controller has been illustrated in FIG. 29, two other controllers with substantially the same circuitry as illustrated will be employed in practice.

As will be appreciated herefrom, an arithmetic circuit 502 in the controller 500 comprises a microprocessor constructed substantially the same as illustrated in FIG. 12. The arithmetic circuit 502 derives the EV and AV signals which are output through switches 504 and 506 in a switching circuit 508 and the output terminals $P_1$ and $P_2$. Also, the arithmetic circuit 502 is connected to a pump driver signal generator 510 to feed a trigger signal thereto. In practice, the trigger signal is produced when the system is to be operated in either the RELEASE mode or the HOLD mode. The driver signal generator 510 produces a driver signal when triggered. The driver signal is applied to the base electrode of a switching transistor $Tr_{32}$ to turn the latter ON. As a result, electrical power from the battery 512 is supplied to a relay coil 514 in a motor relay 516 to energize the relay coil. As a result, the relay switch 518 of the relay circuit 516 closes to complete the power supply circuit to the motor 88 of the fluid pump.

On the other hand, the EV signal output through the $P_1$ output terminal of the controller 500 is applied to the base electrode of a power transistor $Tr_{30}$ via an amplifier 520. When the EV signal is HIGH, the transistor $Tr_{30}$ is turned ON to apply the battery voltage to an actuator coil 522 of an EV valve 524. Similarly, the AV signal from the $P_2$ output terminal of the controller 500 is applied to the base electrode of the power transistor $TR_{31}$ via an amplifier 526. The transistor $Tr_{31}$ is turned ON by a HIGH-level AV signal input to supply battery voltage to an actuator 528 of an AV valve 530 and energize the latter. The combination of the EV and AV signals defines the operation mode of the anti-skid brake control system as described with reference to the foregoing first embodiment.

The arithmetic circuit 502 is also connected for output to a fault detector 532. A waveform shaping circuit 534 receives and processes the signal from the wheel speed sensor 536 into a train of pulses which is then sent to the arithmetic circuit and the fault detector 532. The fault detector 532 is designed to detect program errors, faulty inputs from the wheel speed sensor or errors in the output values of the EV and AV signals. The fault detector 532 may comprise any known circuitry suitable for detecting malfunction of the controller. For example, the error monitoring systems incorporated by reference in the first embodiment may be employed singly or in combination. The fault detector 532 is connected for output to an OR gate 538. The OR gate 538 also receives an input from an OR gate corresponding to the OR gate 344 in the first embodiment. Thus, the shown system is associated with the motor-operation monitoring circuit, the power supply monitoring circuit, the comparator circuit, the actuator-operation monitoring circuit, the battery voltage monitoring circuit and wheel speed sensor monitoring circuit described in the first embodiment.

The OR gate 538 is connected for output to the $P_3$ output terminal of the controller which output the abnormal condition-indicative signal. The OR gate 538 is also connected for output to the driver signal generator 510 to hold the latter at triggered condition for a given period of time, e.g. 2 sec. after execution of fail-safe operations by arithmetic circuit 502 in response to abnormal condition-indicative signal.

In the fail-safe operation in response to the abnormal condition-indicative signal, a relay coil (not shown) controlling the position of a relay switch 540 is energized to open the relay switch. This interrupts the power supply to the actuator coils 522 and 528 of the EV and AV valves. As described previously, when the actuator coils 522 and 528 are both deenergized, the system is in APPLICATION mode allowing manual brake control.

As set forth above, according to the present invention, all of the objects and advantages sought therefor are fulfilled.

What is claimed is:

1. A fail-safe system for an anti-skid brake control system comprising:
    a hydraulic brake circuit;
    a pressure control valve disposed in said brake circuit for increasing hydraulic brake pressure in a wheel cylinder in a first position, for decreasing hydraulic brake pressure in said wheel cylinder in a second position and for holding hydraulic brake pressure in said wheel cylinder constant in a third position;
    an actuator associated with said pressure control valve for operating said pressure control valve among said first, second and third positions according to a control signal, said actuator being connected to an electric power source to receive power therefrom;
    a sensor for detecting wheel speed and producing a sensor signal indicative of the wheel speed;
    a detector for detecting faulty operation of components of said anti-skid brake control system and producing a fault-indicative signal when faulty operation of at least one of said components is detected; and
    a controller receiving said sensor signal and processing the sensor signal, deriving values of wheel acceleration and slippage, deriving said control signal in accordance with said derived values, and said controller being responsive to said fault-indicative signal to perform a first fail-safe operation to hold said control signal at a value at which said pressure control valve is in said first position and to perform a second fail-safe operation to terminate power to said actuator, such that, if said second fail-safe operation which causes termination of power fails to occur, said first fail-safe operation will still cause said pressure control valve to be operated to said first position.

2. The fail-safe system as set forth in claim 1, which further comprises a fault monitor lamp energized by said fault-indicative signal.

3. The fail-safe system as set forth in claim 1, which further comprises a memory associated with said detector for storing data identifying all faulty components in response to said fault-indicative signal.

4. The fail-safe system as set forth in claim 3, further comprising a faulty component indicator corresponding to each detected faulty component and energized when faulty operation of a corresponding one of said components is detected by said detector.

5. The fail-safe system as set forth in claim 4, wherein said detector monitors the power to said actuator and produces said fault-indicative signal when the power is interrupted.

6. The fail-safe system as set forth in claim 5, wherein said detector distinguishes between termination of power to said actuator by said controller and by external conditions, and in the former case does not produce said fault-indicative signal.

7. The fail-safe system as set forth in claim 1, wherein said detector includes means receiving said control signal and signals indicative of the response of the components of the anti-skid brake control system to the current control signal, comparing said control signal and said response-indicative signals and producing said fault-indicative signal when said responsive-indicative signals do not correspond to the current control signal.

8. A fail-safe system for an anti-skid brake control system comprising:
   a hydraulic brake circuit including a wheel cylinder for applying hydraulic braking pressure for decelerating rotation of a vehicular wheel;
   a pressure control valve disposed in said brake circuit for increasing hydraulic brake pressure in said wheel cylinder in a first position, and decreasing hydraulic brake pressure in said wheel cylinder in a second position;
   an actuator associated with said pressure control valve for operating said pressure control valve between said first and second positions according to a control signal, said actuator being connected to an electric power source to receive power therefrom, said actuator operating said pressure control valve in said first position while in a nonactive state thereof and in said second position in an active state thereof;
   a sensor for detecting wheel speed and producing a sensor signal indicative of wheel speed;
   a detector for monitoring operations of components of said anti-skid brake control system and producing a fault indicative signal whenever fault in at least one of said components is detected;
   a controller receiving said sensor signal and processing the sensor signal for deriving brake-controlling parameters on the basis of said sensor signal and deriving said control signal based on said sensor signal and said brake controlling parameters, and said controller performing a first fail-safe operation for disconnecting said actuator from said power source for forcing said actuator to assume said non-active state, and a second fail-safe operation for fixedly holding said control signal at a value affecting said first position of said pressure control valve, such that, if said first fail-safe operation fails to occur, said second fail-safe operation will occur.

9. A fail-safe system for an anti-skid brake control system comprising:
   a hydraulic brake circuit including a wheel cylinder for applying hydraulic brake pressure to a vehicular wheel for deceleration of the latter;
   a pressure control valve disposed in said brake circuit for increasing hydraulic brake pressure in said wheel cylinder in a first position and decreasing hydraulic brake pressure in said wheel cylinder in a second position;
   an actuator cooperatively associated with said pressure control valve and variable in positions between a first inoperative position for positioning said pressure control valve in said first position and a second operative position for positioning said pressure control valve in said second position and connected to an electric power source, said actuator being responsive to a control signal to vary positions between said first inoperative position and said second operative position;
   a sensor for detecting wheel speed and producing a sensor signal indicative of wheel speed;
   a detector for monitoring operations components of said anti-skid brake control system for producing a fault indicative signal whenever fault in at least one of said components is detected; and
   a controller receiving said sensor signal and processing the sensor signal for deriving brake controlling parameters on the basis of said sensor signal and deriving said control signal based on said sensor signal and said brake controlling parameters, said controller being responsive to perform a first fail-safe operation for disconnecting said actuator from said electric power source, for holding said actuator in said first inoperative position, for holding said pressure control valve in said first position, and a second fail-safe operation for fixing said control signal value at a value ordering said first position of said pressure control valve, such that, if said first fail-safe operation fails to occur, said second fail-safe operation will occur.

* * * * *